United States Patent
Tom et al.

(10) Patent No.: US 8,966,520 B2
(45) Date of Patent: Feb. 24, 2015

(54) VIDEO AD SWAPPING IN A VIDEO STREAMING SYSTEM

(75) Inventors: Richard W. Tom, Marina Del Rey, CA (US); Jason A. Kilar, Santa Monica, CA (US); Jean-Paul Colaco, Manhattan Beach, CA (US); Bryon E. Schafer, Los Angeles, CA (US); Wing Chit Mak, Los Angeles, CA (US)

(73) Assignee: Hulu, LLC, Santa Monica, CA (US)

( * ) Notice: Subject to any disclaimer, the term of this patent is extended or adjusted under 35 U.S.C. 154(b) by 38 days.

(21) Appl. No.: 13/569,066

(22) Filed: Aug. 7, 2012

(65) Prior Publication Data

US 2013/0086607 A1    Apr. 4, 2013

Related U.S. Application Data

(60) Provisional application No. 61/542,743, filed on Oct. 3, 2011.

(51) Int. Cl.

| H04N 7/10 | (2006.01) |
| G06Q 30/02 | (2012.01) |
| H04N 21/234 | (2011.01) |
| H04N 21/258 | (2011.01) |
| H04N 21/262 | (2011.01) |
| H04N 21/44 | (2011.01) |

(Continued)

(52) U.S. Cl.
CPC ..... *G06Q 30/0241* (2013.01); *H04N 21/23424* (2013.01); *H04N 21/25883* (2013.01); *H04N 21/25891* (2013.01); *H04N 21/262* (2013.01); *H04N 21/44016* (2013.01); *H04N 21/4532* (2013.01); *H04N 21/4755* (2013.01); *H04N 21/482* (2013.01); *H04N 21/6581* (2013.01); *H04N 21/812* (2013.01); *H04N 21/8153* (2013.01); *H04N 21/8352* (2013.01)
USPC .................... 725/32; 725/34; 725/35; 725/36

(58) Field of Classification Search
None
See application file for complete search history.

(56) References Cited

U.S. PATENT DOCUMENTS

| 6,760,746 B1 | 7/2004 | Schneider |
| 7,197,758 B1 | 3/2007 | Blackketter et al. |

(Continued)

OTHER PUBLICATIONS

International Search Report mailed Apr. 1, 2013 from International Patent Application No. PCT/US2012/058502 filed Oct. 2, 2012.

(Continued)

*Primary Examiner* — Cai Chen
(74) *Attorney, Agent, or Firm* — Fountainhead Law Group PC

(57) ABSTRACT

Configuration of advertisements in a streaming video segment works in cooperation with a client device. Using a selection algorithm, a server selects a first number of default video advertisements for a video streaming session, and a second number of alternative video ads greater than the first number. The server provides identifiers for the alternative video advertisements and transmits the identifiers to the client device prior to a corresponding ad break in the streaming video. During or before streaming of one of the default video advertisements to the client device, the server detects a signal from the client device requesting that one of the alternative video advertisements be swapped for the one of the default video advertisements, interrupts streaming of the default video, and initiates streaming of the one of the alternative video advertisements, in response to detecting the signal. Corresponding operations may be performed by the client device.

21 Claims, 15 Drawing Sheets

(51) Int. Cl.
*H04N 21/45* (2011.01)
*H04N 21/475* (2011.01)
*H04N 21/482* (2011.01)
*H04N 21/658* (2011.01)
*H04N 21/81* (2011.01)
*H04N 21/8352* (2011.01)

(56) References Cited

U.S. PATENT DOCUMENTS

| | | |
|---|---|---|
| 7,415,537 B1 | 8/2008 | Maes |
| 7,665,107 B2 | 2/2010 | Goodman et al. |
| 7,801,054 B2 | 9/2010 | Reichman et al. |
| 7,945,926 B2 | 5/2011 | Dempski et al. |
| 8,359,612 B2 | 1/2013 | Barton |
| 8,516,518 B2 | 8/2013 | Bolyukh et al. |
| 2002/0129362 A1 | 9/2002 | Chang et al. |
| 2002/0138831 A1 | 9/2002 | Wachtfogel et al. |
| 2002/0194593 A1 | 12/2002 | Tsuchida et al. |
| 2003/0101454 A1 | 5/2003 | Ozer et al. |
| 2003/0105678 A1 | 6/2003 | Bratton |
| 2003/0126598 A1 | 7/2003 | Agnihotri et al. |
| 2003/0149975 A1 | 8/2003 | Eldering et al. |
| 2003/0167202 A1 | 9/2003 | Marks et al. |
| 2004/0019905 A1 | 1/2004 | Fellenstein et al. |
| 2004/0054577 A1 | 3/2004 | Inoue et al. |
| 2004/0158852 A1 | 8/2004 | Wysocki |
| 2005/0060745 A1 | 3/2005 | Riedl et al. |
| 2006/0168616 A1* | 7/2006 | Candelore .................. 725/34 |
| 2007/0220552 A1 | 9/2007 | Juster et al. |
| 2008/0040741 A1 | 2/2008 | Matsumoto |
| 2008/0059312 A1 | 3/2008 | Gern et al. |
| 2008/0059997 A1 | 3/2008 | Plotnick et al. |
| 2008/0066107 A1 | 3/2008 | Moonka et al. |
| 2008/0115161 A1 | 5/2008 | Kurzion |
| 2008/0127246 A1 | 5/2008 | Sylvain |
| 2008/0137541 A1 | 6/2008 | Agarwal et al. |
| 2008/0229353 A1 | 9/2008 | Morris et al. |
| 2008/0229371 A1 | 9/2008 | Mick et al. |
| 2008/0284911 A1 | 11/2008 | Lemmers et al. |
| 2008/0307454 A1 | 12/2008 | Ahanger et al. |
| 2009/0012867 A1 | 1/2009 | Lerman et al. |
| 2009/0013347 A1 | 1/2009 | Ahanger et al. |
| 2009/0094634 A1 | 4/2009 | Haberman et al. |
| 2009/0228920 A1* | 9/2009 | Tom et al. ............... 725/35 |
| 2009/0282098 A1 | 11/2009 | Karaoguz et al. |
| 2010/0077095 A1 | 3/2010 | Wong et al. |
| 2010/0198697 A1 | 8/2010 | Brown et al. |
| 2010/0251288 A1 | 9/2010 | Carlucci et al. |
| 2012/0110615 A1 | 5/2012 | Kilar et al. |
| 2012/0110618 A1 | 5/2012 | Kilar et al. |
| 2014/0115631 A1 | 4/2014 | Mak |

OTHER PUBLICATIONS

Saito et al., "Implementation of an Internet Broadcasting System with Video Advertisement Insertion based on Audience Comments," 2010 International Conference on P2P, Parallel, Grid, Cloud and Internet Computing, 2010, pp. 505-510.
Chen et al., "Automatic Insertion of Advertisements into a Video Sequence," Proceeding of the Ninth International Conference on Machine Learning and Cybernetics, Qingdao, Jul. 11-14, 2010, pp. 2121-2126.
Covell et al., "Detecting Ads in Video Streams Using Acoustic and Visual Cues," IEEE Invisible Computing, Dec. 2006, pp. 135-137.
International Search Report from International Application No. PCT/US2011/053480 mailed Feb. 16, 2012.
International Search Report from International Application No. PCT/US2011/053506 mailed Feb. 22, 2012.

* cited by examiner

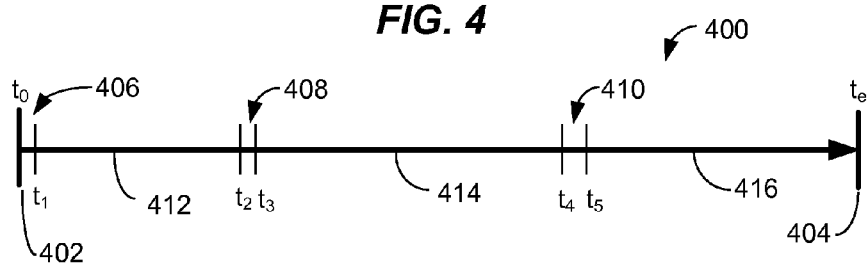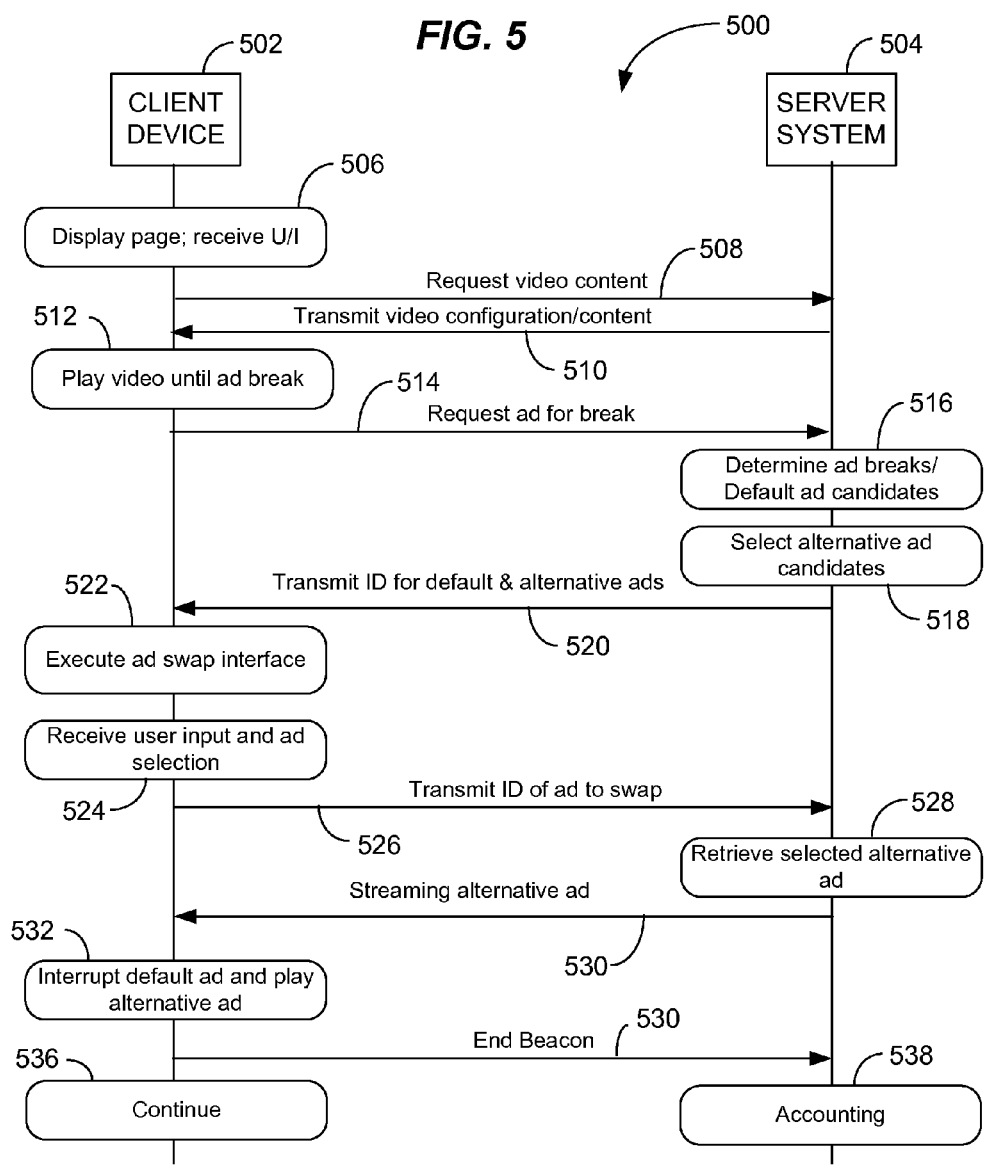

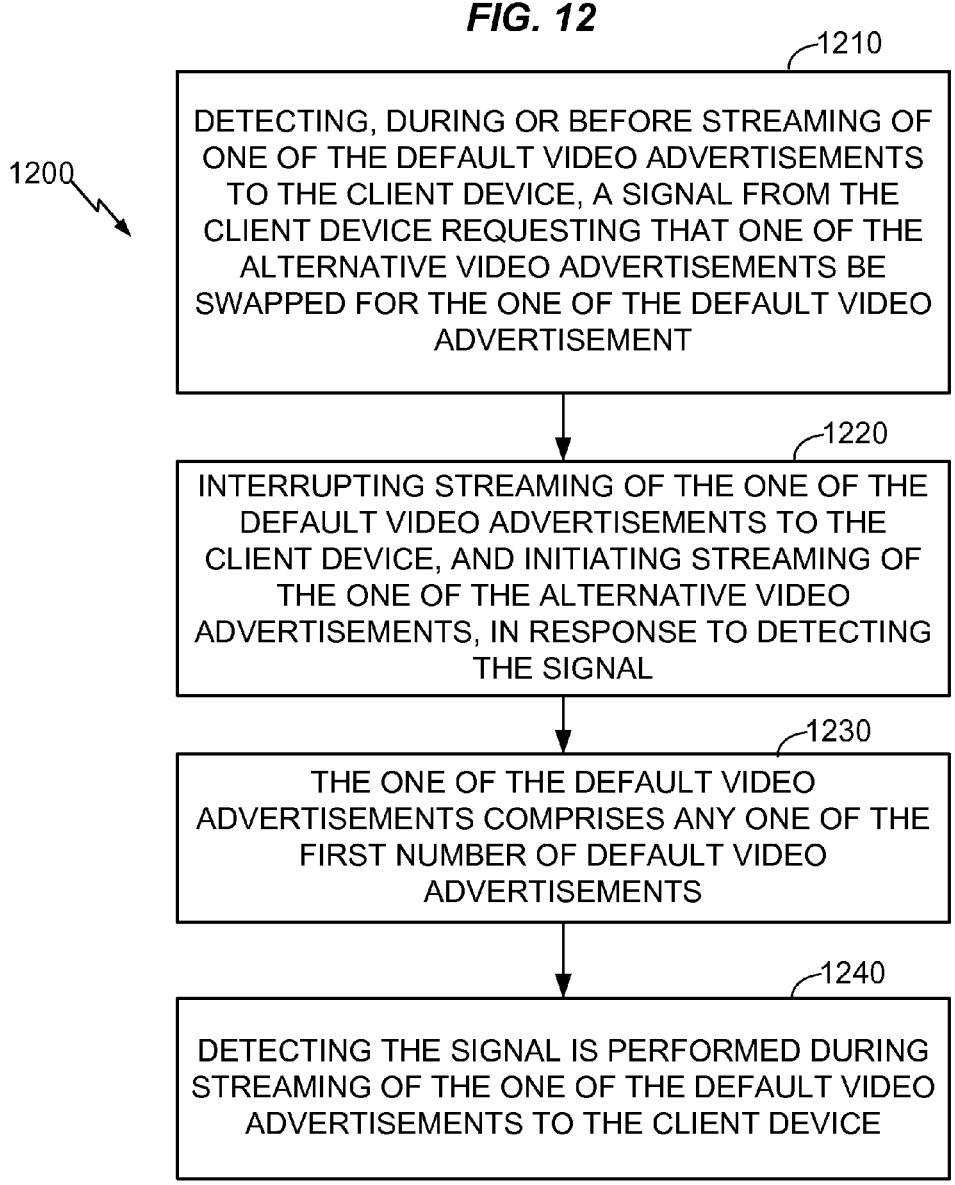

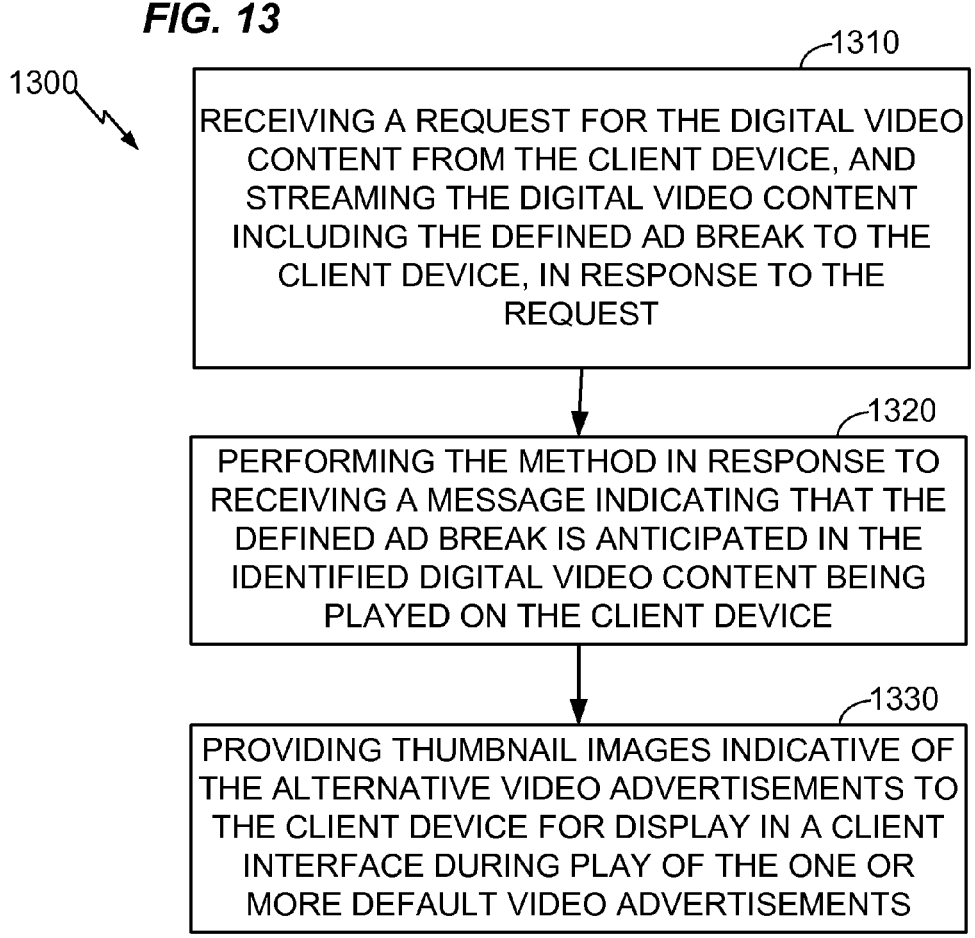
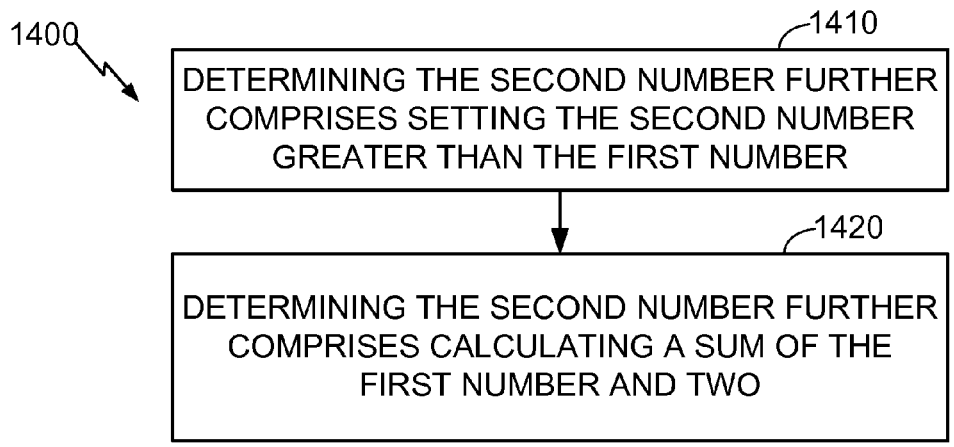

VIDEO AD SWAPPING IN A VIDEO STREAMING SYSTEM

CROSS-REFERENCE TO RELATED APPLICATION

This application claims priority under 35 U.S.C. §119(e) to U.S. provisional application Ser. No. 61/542,743, filed Oct. 3, 2011, which is hereby incorporated by reference, in its entirety.

FIELD

The present application relates generally to input/output processing using a computer, and more particularly to video advertisement swapping in a video segment, for example a streaming video segment, in response to user input.

BACKGROUND

Advertising-supported distribution of audio-video data may be implemented from a content server to remote client devices over computer networks, telecommunications networks, and combinations of such networks, using various methods, for example progressive downloading or streaming.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Unlike progressive downloading, streaming media can be delivered on-demand or live. Progressive download requires downloading the entire file or downloading enough of the entire file to start playback at the beginning, whereas streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages can include commands for enabling control functions such as fast forward, fast reverse, pausing, or seeking to a particular part of the file at the client. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad pods" or "ad breaks." With streaming video, the media player may be configured so that the client device cannot play the video without also playing predetermined advertisements during the designated ad breaks. While this feature is helpful for ensuring that ad impressions are delivered to the client device, a lack of ability for the user to influence or control the advertising content played during the ad breaks may reduce the interest of some viewers in viewing streaming video content with inserted advertising.

These and other limitations of prior methods for controlling advertising inserted in streaming video or progressively downloaded video may be overcome by the novel methods and apparatus disclosed herein.

SUMMARY

Methods, apparatus and systems for enabling preconfigured video advertisement swapping in a video streaming system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A computer server in communication with one or more client devices may perform a method for preconfigured video advertisement swapping in a video streaming system. The method may include selecting one or more default video advertisements configured for play during a defined ad break in identified digital video content (e.g., streaming video), using a selection algorithm operating on a computer. The method may further include determining a first number of the one or more default video advertisements, and determining a second number based on the first number, wherein the second number is not less than the first number. For example, the first number may be one and the second number may be between one and three. For further example, the first number may be one or greater and the second number may be determined by zero or more (for example, two) added to the first number. The method may further include selecting a second number of alternative video advertisements, using the selection algorithm operating on the computer.

Both the default ads and the alternative ads may be selected using any desirable selection criteria, including criteria based on available advertisements, content of the streaming session, user profile, or other criteria. In an aspect, the selection algorithm selects the default video advertisements and the alternative video advertisements based at least in part on user preference information. In an alternative aspect, the selection algorithm selects the default video advertisements and the alternative video advertisements based at least in part on advertiser preference information.

The alternative advertisements may be selected at any appropriate time prior to presentation of the alternative ads on the client. For example, the system may select all alternative ads for a video program in advance of a first ad slot. In other embodiments, the system may select a set of alternative ads for each ad slot, just prior to the ad slot on the client player device. In the alternative, or in addition, the system may select alternative ads for a particular default ad in advance of playing the default ad or shortly after beginning play of the default ad.

Once the advertisements are selected, the method may include transmitting identifiers for the default and alternative video advertisements to a client device prior to occurrence of the ad break. The client device may use the ad identifiers to request the default and/or alternative video advertisements from the server for play in an upcoming ad break in the streaming session.

The method may further include receiving a request for the digital video content from the client device, and streaming the digital video content including the defined ad break to the client device, in response to the request. The streaming content may include, or may be used with, start beacons and end beacons to indicate the start and end of respective ad breaks at the client device. The client device may transmit such beacons to the server, which may provide selected advertisements in response to the beacons. In an aspect, the selected one of the default video advertisements may be any one of the first number of default video advertisements.

The method may be initiated by the server and performed in response to receiving a message indicating that the defined ad break is anticipated in the identified digital video content being played on the client device. In other words, selection of the default ads and the alternative ads may be deferred or delayed until the server receives the message indicating an incipient ad break from the client.

The method may further include the server detecting, during or before streaming of one of the default video advertisements to the client device, a signal from the client device requesting that one of the alternative video advertisements be swapped for the one of the default video advertisements. The signal may be generated by the client device in response to user input via a user interface. The user input may be received by the client before the client plays the default ad, or while the default ad is playing.

The method may further include, at the server, interrupting streaming of the one of the default video advertisements to the client device, and initiating streaming of the one of the alternative video advertisements, in response to detecting the signal from the client selecting an alternative ad. Detecting the signal may be performed during streaming of the one of the default video advertisements to the client device.

In separate aspects, the method may include providing thumbnail images indicative of the alternative video advertisements to the client device for display in a client interface during play of the one or more default video advertisements. For example, a thumbnail image or other information pertaining to an alternative video ad available for selection by the user may be displayed in a separate window or area of the client display device.

Complementary operations, features, and aspects may also be implemented at a client device in communication with the computer server. Methods and apparatus for implementing preconfigured video advertisement swapping in a video streaming system at a client device are described in the detailed description below.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, network-enabled televisions, set-top boxes, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for enabling preconfigured video advertisement swapping in a video streaming system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIG. 4 is a line diagram illustrating aspects of a video segment including ad breaks.

FIG. 5 is a sequence diagram illustrating an example of a call flow between a server system and a client device implementing selection of advertising in streaming video using an interactive ad swap process.

FIGS. 11-15 are diagrams illustrating operations that may be performed by a network node in connection with selection of advertising in a streaming video segment using preconfigured video ad swapping.

DETAILED DESCRIPTION

Figure 1:
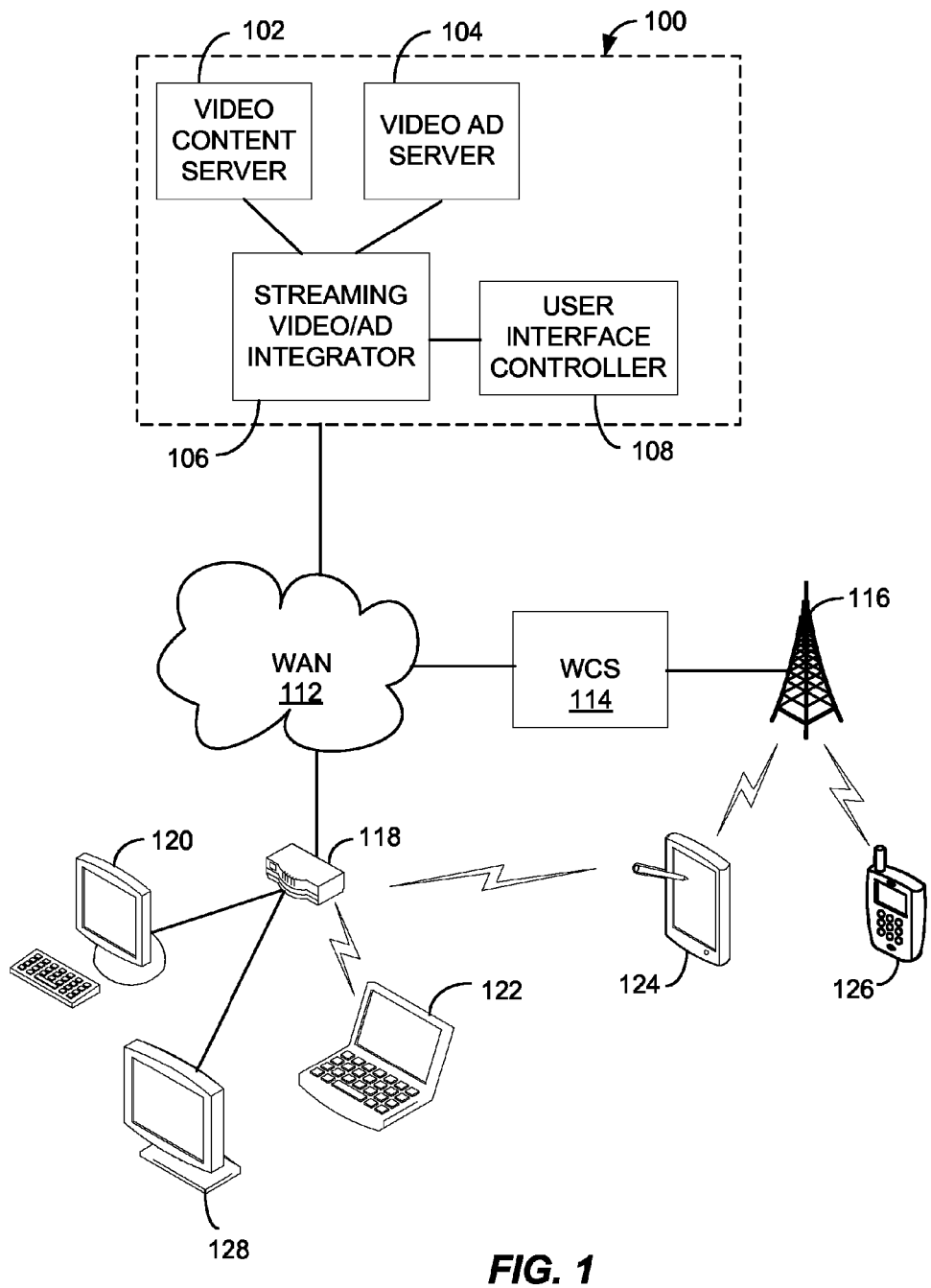
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks. The video streaming system 100 may include one or more computer servers or modules 102, 104, 106, and/or 108 distributed over one or more computers. Each server 102, 104, 106, and/or 108 may include, or may be operatively coupled to, one or more data stores, for example databases, indexes, files, or other data structures (not shown). A video content server 102 may access a data store of various video segments; for example, television episodes, motion pictures, and other content produced as primary content of interest to consumers. The video content server 102 may serve the video segments as directed by a user interface controller module 108.

A video advertising server 104 may access a data store of relatively short video segments (e.g., 10 second, 30 second, or 60 second segments) configured as advertising for a particular advertiser or message. The advertising may be provided for an advertiser in exchange for payment of same kind, or may comprise a promotional message for the system 100, a public service message, or some other information. The ad server 104 may serve the video advertising segments as directed by the user interface controller 108. The ad server 104 may select default video advertisements, and for each default video advertisement, or for a given set of default advertisements, the ad server may further select a number of alternative advertisements. The ad server 104 may select the alternative advertisements so that there are more alternative advertisements than default video advertisements in the set. For example, if there is a single default ad selected for a streaming session, the ad server may select three alternative ads, by adding the fixed number two to the number of default ads (one). For further example, if the ad server selects a total of four default advertisements for a streaming session, it may then select six (four plus two) default advertisements, for an ad swap system that permits one alternative ad swap for each default ad, no ad swaps for alternative ads, and three alternative ads for every ad swap opportunity. In this system, the selection of "X+2," wherein X is the number of default ads in the program for which an ad swap feature is enabled, guarantees that at least three unselected alternative ads will be available even if the viewer exercises every ad swap opportunity.

The video streaming system 100 may further include an integrator component 106 that integrates video content and video advertising into a streaming video segment as directed by the controller 108. The controller 108 may determine the selection or configuration of advertising in the streaming video, based on user input from a client device selecting, or declining to select, alternative advertising at an ad swap opportunity. The integrator 106 may integrate a selected default and/or alternative video advertisement into streaming content, based on one or more signals from a streaming client. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 116 and/or other network 114. Such client devices may include, for example, one or more laptop computers 122, desktop computers 120, "smart" mobile phones 126, notepad devices 124, network-enabled televisions 128, or combinations thereof, via a router 118 for a LAN, via a base station 116 for a wireless telephony network 114, or via some other connection. In operation, such client devices 120, 122, 124, 126, 128 may send and receive data or instructions to the system 100, in response to user input received from user input devices or other input. In response, the system 100 may serve video segments, video ads and related information to the client devices 120, 122, 124, 126, 128 and configure video segments with advertising based on user input to an ad swap process. The devices 120, 122, 124, 126, 128 may output video and related content from the streaming video segment using a display screen, projector, or other video output device. In certain embodiments, the system 100 configured in accordance with the features and aspects disclosed herein may be configured to operate within or support a cloud computing environment. For example, a portion of, or all of, the servers 102, 104 or 108 may reside in a cloud server.

Figure 2:
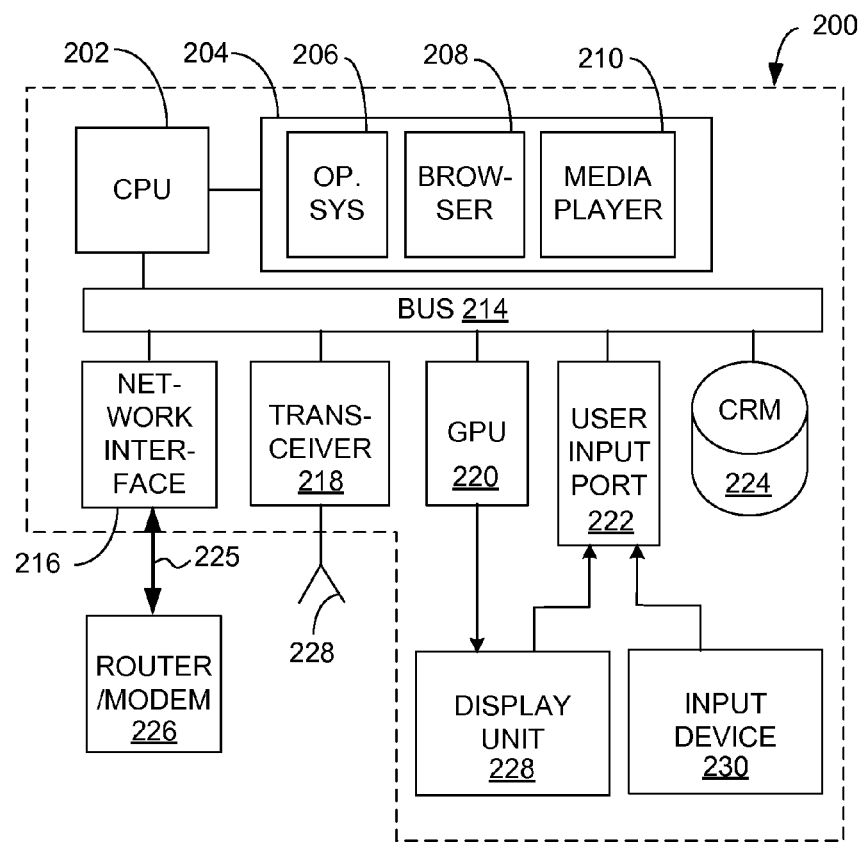
FIG. 2 is a schematic block diagram illustrating an embodiment of a client device for supporting and executing the systems and methods described herein.

Referring to FIG. 2, a diagrammatic view of an example client device 200 is illustrated. The client device 200 may be, or may include, a computer. One or more of the client devices 120, 122, 124, 126, 128 shown in FIG. 1 may be configured as, or may include, a computer or device configured as the device 200. In selected embodiments, the computer 200 may include a processor 202 operatively coupled to a processor memory 204, which holds binary-coded functional modules for execution by the processor 202. Such functional modules may include an operating system 206 for handling system functions such as input/output and memory access, a browser 208 for accessing information via the World Wide Web or similar network infrastructure, and a media player 210 for playing streaming video and communicating with a streaming video system. The media player may facilitate functions of a user interface for soliciting and receiving user input data to be used in an ad swap process, and communicating with a video streaming server to implement functions of the process. In the alternative, or in addition, some portion or all of the ad swap process functions may be implemented using a module (not shown) separate from the media player 210.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the client device 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the client device 200 to perform one or more operations of a method as described herein.

A communication interface 216 may also be connected to the bus 214. The communication interface 216 may provide or support two-way data communication between the client device 200 and one or more external devices, e.g., the streaming system 100, optionally via a router/modem 226 and a wired or wireless connection 225. In the alternative, or in addition, the client device 200 may include a transceiver 218 connected to an antenna 228, through which the client 200 may communicate wirelessly with a base station for a wireless communication system or with the router/modem 226.

The client device 200 may be connected (e.g., via the bus 214 and graphics processing unit 220) to a display unit 228. A display 228 may include any suitable configuration for displaying information to a user of the client device 200. For example, a display 228 may include or utilize a cathode ray tube (CRT), liquid crystal display (LCD), touchscreen LCD (e.g., capacitive display), light emitting diode (LED) display, projector, or other display device to present information to a user of the client device 200 in a visual display.

One or more input devices 230 (e.g., an alphanumeric keyboard, microphone, keypad, remote controller, game controller, camera or camera array) may be connected to the bus 214 via a user input port 222 to communicate information and commands to the client 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space.

The client device 200 may be used to transmit, receive, and display one or more streaming video segments. In selected embodiments, such transmitting, receiving, and displaying may be in response to the processor 202 executing one or more sequences of one or more instructions contained in main memory 204. Such instructions may be read into main memory 204 from another non-transitory computer-readable medium (e.g., a storage device 224).

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical or magnetic disks, such as a storage device 224. Volatile media may include dynamic memory, such as main memory 204. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Figure 3:
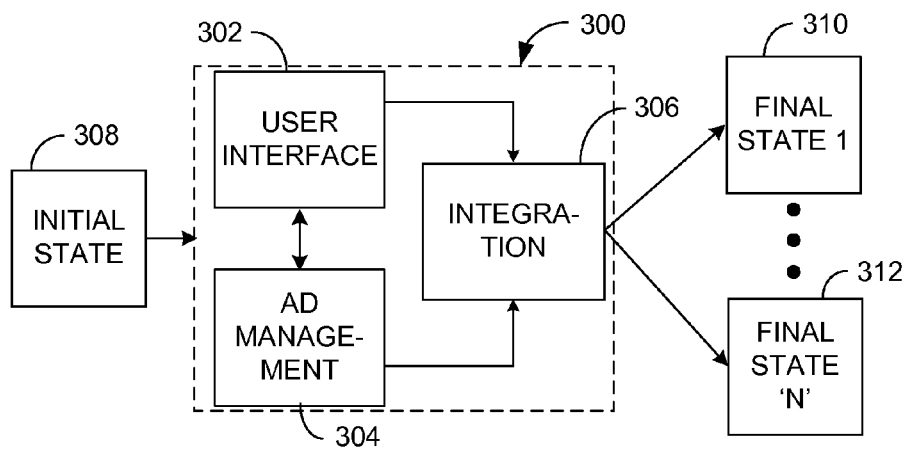
FIG. 3 is a state diagram illustrating general aspects of an interactive ad swap process as used for advertising selection in a streaming video segment.

Referring to FIG. 3, general aspects of an ad swap process 300 used for selection of advertising in a streaming video segment are illustrated as a state diagram. The initial state 308 represents a selection of default advertisements and corresponding breaks of a selected streaming video segment. For example, for a 24 minute television episode, three or four breaks may be provided totaling approximately six minutes, with a corresponding number of advertisements selected to fill the available breaks according to an applicable rule set for advertisement selection. In addition, in some embodiments an excess number of advertisements e.g., default ads plus alternative ads) may be selected for the initial state 308. The initial state 308 may be represented in a computer memory in various ways, for example by a list of advertising identifiers each identifying a specific video ad, and optionally one or more variables representing a number, duration and placement of ad breaks, associated with an identifier for a streaming video segment and/or an identifier for a streaming video session with a particular client device. In an alternative embodiment, one or more of the number, duration and placement of ad breaks may be determined by default based on an attribute of the video segment, such as run length. It should be apparent that the initial state 308 may be defined by data that represents, among other things, prospective default advertisements to be displayed during a video segment. As such, initial state data represents a physical state of a video output device that may be achieved at a later time when the video segment is played on a client device.

The ad swap process 300 is (or includes) an input-output computation process performed by a computer processor, which operates on the initial state 308 to output one of several possible final states, including a first final state 310 and a last ("Nth") final state 312. Each of the final states 310, 312, etc., likewise represents a selection of advertisements and corresponding breaks of a selected streaming video segment, generally without an excess number of advertisements, because once the final state is achieved any unused alternative ads are discarded. The ad swap process 300 may therefore operate as a state machine that accepts the initial state 308 and user input via an input device as inputs, and transforms the state data representing a physical state of a video output device into one of many ("N") definite final states. Subsequent, the final output state is realized in physical output from a client device, the output including display of a streaming video segment that is configured based on a selected one of the final output states.

The ad swap process 300 may include several interactive modules, for example, a user interface module 302, an ad service or management module 304 and a integration module 306. In some embodiments, the ad swap process 300 may include only one of the modules 302 and 304. The module 300 may include other modules, for example, a video content server module, tracking module, graphics module, etc., which for illustrative simplicity are not shown. The user interface module 302 may provide an interface for user input concerning whether or not to swap out a particular ad for an alternative ad, and provide an indication of the input to the integration module and/or to the ad service or management module 304. The ad service or management module 304 may respond to user input (or lack of user input) from the user interface module and determine an identity of each video advertisement include in an ad break. The integration module 306 determines the final state based on input from the user interface module 302 and/or the ad service or management module 304.

FIG. 4 is a line diagram illustrating aspects of a video segment timeline 400 including ad breaks 406, 408 and 410. A video segment includes video data characterized by a sequence of video frames that are output in order at a defined frame rate to generate video output. At such, a video segment includes an initial or first frame at inception time "$t_0$" 402 of video output, and each subsequent frame is output at a defined time "t" after inception until a terminal or end time "$t_e$" 404. Thus, each frame defines a particular time or "temporal point" in the streaming video segment, typically measured from the time of inception. For example, for a video configured for 30 frames per second, the $300^{th}$ frame defines a temporal point 10 seconds after inception. A temporal point in a streaming video segment may sometime be referred to herein as a "location" in relation to a progress bar, time line or other time indicator.

Any non-negative, integral number of ad breaks 406, 408 and 410 may be configured in the video time line. Each ad break may be defined by a location and duration. For example, the first ad break 406 is located at "$t_0$" and has a duration of "$t_1$-$t_0$"; the second ad break 408 is located at "$t_2$" and has a duration of "$t_3$-$t_2$"; and the third ad break 410 is located at "$t_4$" and has a duration of "$t_5 t_4$". The inter-break portions 412, 414 and 416 are used for playing requesting video content, and the ad breaks are used for playing video advertisements. In video streaming embodiments, a streaming media player operating on the client device may cause the video content to play in the defined inter-break portions 412, 414, 416 and receive streaming advertising videos of appropriate duration for playing in all of the ad breaks 406, 408, 410. The duration of the ad breaks may be predetermined, or may be determined on an ad hoc basis based on the duration of respective video ads streamed to the media player for playing in respective ones of the ad breaks.

FIG. 5 illustrates an example of a call flow 500 between a server system 504 and a client device 502 for implementing user controlled swapping of video advertising in a streaming video. The call flow 500 assumes video streaming is provided through a web page interface and streaming media player installed at the client device; however, the inventive concepts herein are not limited to such environments. If a web page environment is used, a call flow may initiate, at 506, with the client device 502 displaying a web (e.g., World Wide Web) page received from the server system 504 including links for requesting one or more video segments. For example, the web page may comprise a "home" or personalized page including a list of selected video segments of general interest, or selected as likely to be of interest to a specific user based on a user profile. The client device may receive 506 user input selecting one of the links, for example, a "point and click" input from a pointing device, a touch input on a touchscreen device, or a spoken command. In response to the input, the client device may request a specific video segment 508 by transmitting a Hypertext Transfer Protocol (HTTP) "get" request, or other suitable request message, to the server system 504. The server may retrieve and/or create configuration data for a streaming session, retrieve the content data from a data store, and at 510, provide the configuration data and streaming content data to the client device 502. It should be appreciated that the client 502 may play the streaming content 512 as it is received, so to a certain extent the operations 510 and 512 may occur contemporaneously.

While playing the streaming video, the client 502 may detect that a defined ad break is about to occur (for example, in 1, 2 or 3 seconds from a current frame). The configuration data may designate one or more default ads as non-swappable, which the client may play without initiating an ad swap procedure. In some implementations, every ad in the break will be swappable. In response to detecting the incipient ad break, the client 502 may, at 514, request one or more ads for the break by signaling to the server 504. In response to receiving the request message 514, the server system 504 may, at 516, determine a selection of default advertising videos and ad breaks for the video segment requested by the request message. In so doing, the server system may access a record pertaining to user preferences or past activity by a user identified, for example by a user account, as making the request for the video segment. Any suitable method may be used to select an initial set of default advertisements.

In addition, the server system may, at 518, determine a number of alternative video advertisements, which may exceed the number of swappable default advertisements by a fixed number "n", e.g., n=two, or n=three. The alternative ads may be selected using the same or similar process as the default ads, and may be selected to comply with the same rules (for example, no competitor ads and no duplicates in the same video program). An output of the determining processes 516 and 518 may include the initial state information 308 shown and described in connection with FIG. 3. In either case, the server system 504 may, at 520, transmit the initial state information (candidate ad identifiers) to the client device with video content. The number and identity of the alternative ads may be selected at any appropriate time prior to playing corresponding default ads at the client. For example, the server system may select the alternative ads just prior to an ad slot, such as in response to a signal from the client device. For further example, the server may, in alternative embodiments, select the alternative ads when the video program first begins to play at the client, or immediately after initiating streaming of a first default ad for an ad slot.

The client device 502 may, at 522, if the default ad for a break is swappable (e.g., is not designated as non-swappable or is designated as swappable by the configuration data), the client device 502 may begin playing the swappable ad while displaying an ad swap interface object. To play the default ad, the client 502 may request the default ad from the server 504, and receive the ad content from the server; these operations are omitted from FIG. 5 for illustrative simplicity. If the user elects to interact with the ad swap interface object in a way that indicates a desired to swap out the default ad, the client device 502 may receive user input at 524. Also at 524, in response to receiving input indicating a user desire to swap a default ad, the user interface may display an alternative ad choice menu, displaying some number of the alternative ads (e.g., three). The user may select one of the alternative ads presented by the alternative ad choice menu, using a user input device. Conversely, if the user does not indicate any desire to swap the default ad, or affirmatively rejects an offer to swap the ad, the client device may continue playing the default ad and continue playing the streaming video program at 536.

At 526, the client device 502 may transmit an identifier for the alternative ad indicated by user input received while displaying the alternative ad choice menu to the server system 504. At 528, the video server system 504 may retrieve the selected video advertisement from a data store and at 530, begin streaming the alternative ad to the client device. Once the client device 502 receives the alternative ad content, at 532 the client device may interrupt playing of the default ad and play the alternative ad in the ad break. Once play of the alternative ad is finished, the client device 502 may, at 532, transmit a signal (e.g., "end beacon") to the server system indicating that play of the alternative ad was completed at the client. The server 504 may use the signal to trigger an accounting function 538 for advertising commerce, ad tracking, and similar purposes. Meanwhile, at 536, the client device 502 may continue to play the streaming video content until the next ad break is reached or the video content is completed or terminated by the user.

Thus, the client device 502 and server system 504 may cooperate to produce video output configured based on user input to an interactive ad swap process. The ad swap process may therefore operate to transform data representing video output to a different state, while engaging the user of the video streaming service in an entertaining and rewarding activity and enhancing enjoyment of the video streaming service.

Dynamic Ad Selector

In alternative embodiments sometimes generally referred to as dynamic "Ad Selector," the server system may enable users to control the entire ad experience of a streaming video program by choosing the ad experience most appealing to the user in advance of playing the video program. A user interface enables the user to select one of several commercial options, and the user selections are used to determine which advertisements are presented with the program. In an aspect, the ad selection on the system side prioritizes the advertisements of most interest to the user over other advertisements. In a static Ad Selector implementation, the set of candidate ads is fixed and used for different instances of the Ad Selector until refreshed by the system. In dynamic Ad Selector, each commercial option or set of alternative ads is individually determined by the system for each instance of the Ad Selector.

The user interface may automatically present Ad Selector options to the user after the user selects the media program for viewing and before the media program playback begins. The advertising options presented may be a choice of specific advertisements to be provided in conjunction with the media program, or a choice of categories from which advertisements are chosen and provided in conjunction with the media program.

Figure 6:
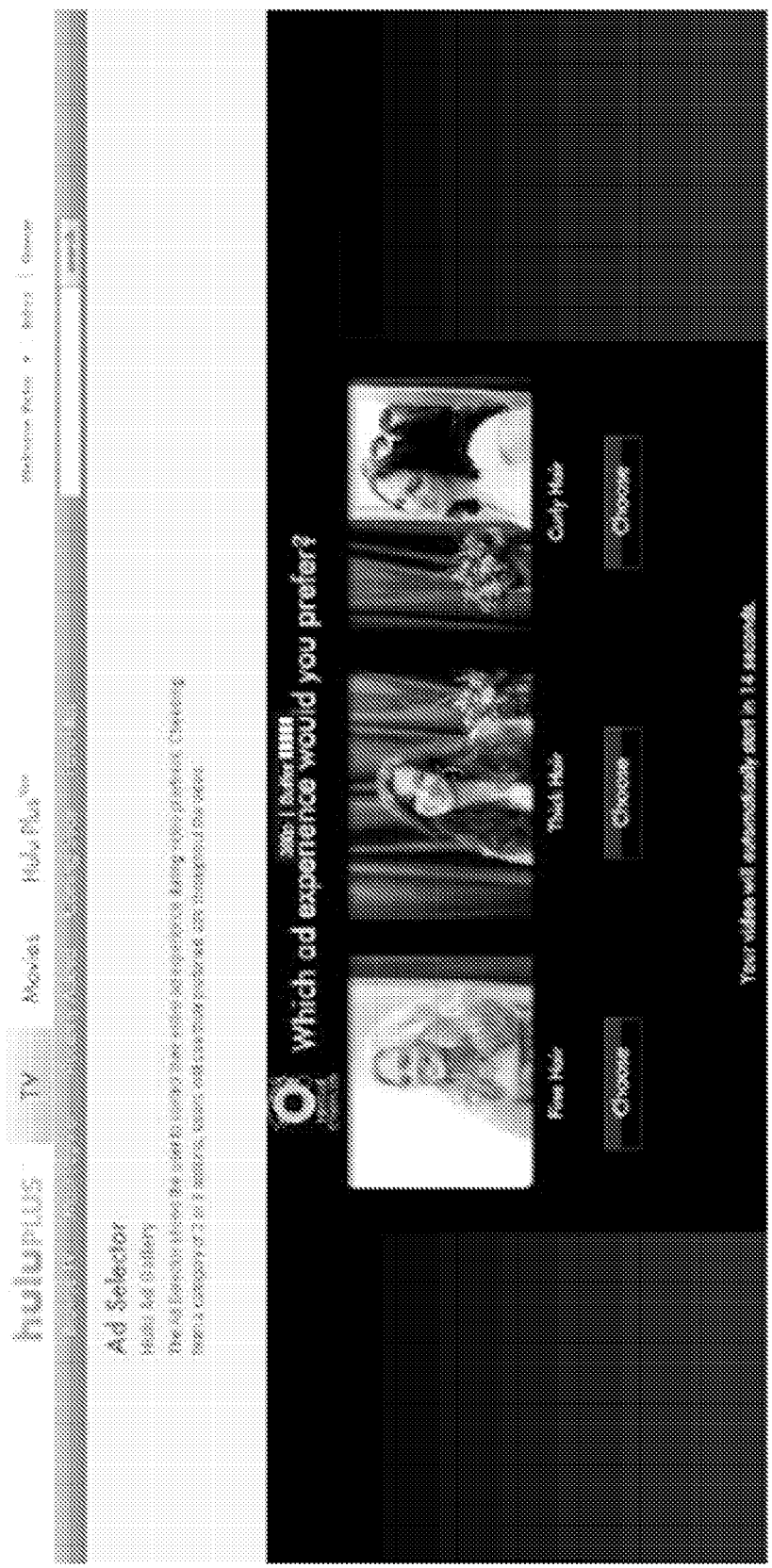
FIG. 6 illustrates a screenshot of an "ad selector" interface inviting user selection of advertising in a streaming video segment.

For example, in response to a user request to view a media program, an interface 600 as shown in FIG. 6 may be presented. The interface 600 may include a plurality of candidate advertising categories for user selection. Each category may have associated member advertisements that are to be provided in conjunction with the identified media program. Advertisements may be categorized by product or service (automobiles, home, food, etc.) or by target demographic (lifestyle, travel, age, sex, hair type, etc.) and may be based on user responses to previously completed surveys or user demographic information provided in the registration process. In the embodiment illustrated above, the survey/demographic information may have indicated that the viewer was female, but did not indicate her hair type. The viewer can then choose a hair type, and based on that information, the advertisements provided in conjunction with the selected media program will include advertisements directed at that user's hair type. Further, the information provided in response can be used to augment the user's demographic information, so that advertisements may be better targeted to the user in the future.

In one embodiment, the system may select all of the advertisements henceforth provided in conjunction with the video streaming session will be advertisements chosen from the category selected by the user (in the above example, all will be relevant to thick hair if the viewer chooses that category). Also, the user's choice of category is typically valid only for the selected media program. That is, after the user has viewed the media program and selected another to view, the advertisements chosen for that other media program may or may not include advertisements that are members of the selected advertisement category.

Figure 7:
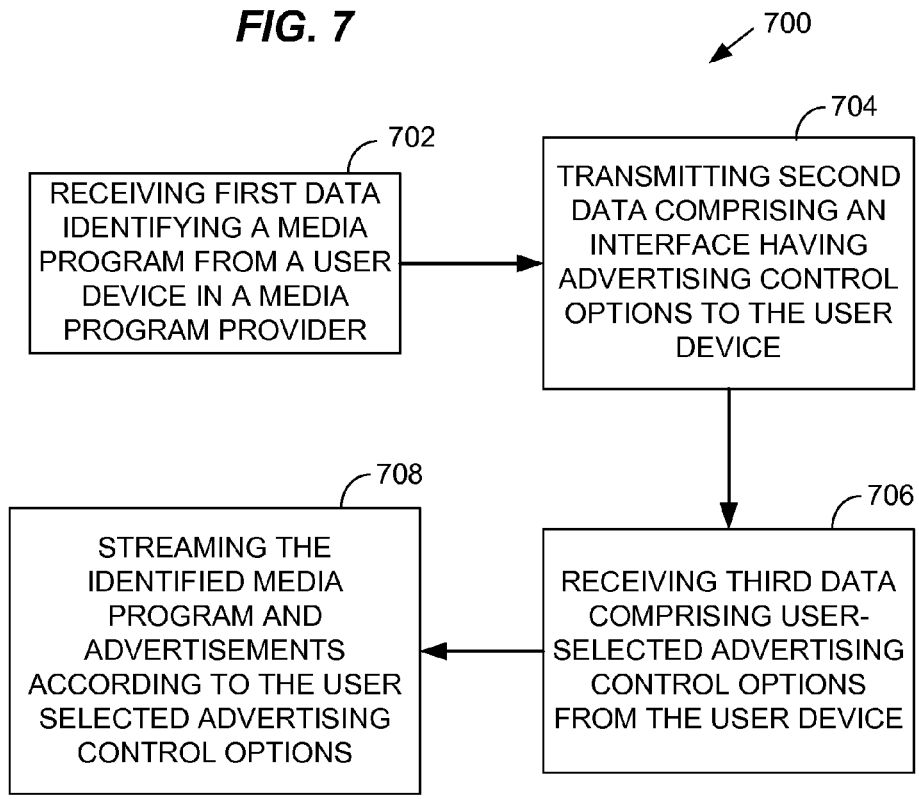
FIG. 7 is a flow chart showing aspects of an ad selector method.

The foregoing embodiments may be implemented as a method 700 of providing advertisements in conjunction with a streamed media program by a computer server operating in cooperation with a client device, as diagrammed in FIG. 7. The method may include, at 702, receiving first data from a user device in a media program provider, the data identifying the media program (e.g., video program) to be streamed to the user device. The method may further include, at 704, transmitting second data to the user device, the second data comprising an interface having advertising control options. The method may further include, at 706, receiving third data from the user device, the third data comprising user-selected advertising control options. For example, the control options may identify a user preference or profile item used for selection of advertisements, identifiers for user-selected video ads or ad types, or other information. The method may further include, at 708, streaming the identified media program and advertisements according to the user selected advertising control options.

In embodiments of the method 700, the second data is transmitted from the server to the client device before beginning transmission of the streamed media program. In addition, the second data may be transmitted automatically by the server to the client in response to receipt of the first data from the user device, and without receipt of further data from the user device. In related, more detailed aspects, the server may include data defining an interface with a plurality of candidate advertisements for selection to the identified media program, and may configure the user-selected advertising control options as user-selectable advertisements. In addition, the step of streaming the identified media program and advertisements according to the user-selected advertising control options may further include streaming the identified media program and advertisements according to the user-selected advertising control options. In some embodiments, the user-selected advertisements apply to only the identified media program. The user-selected advertising control options may consist of all of the advertisements to be provided in conjunction with the media program.

In other, related aspects, the server may include data defining a plurality of candidate advertising categories for selection in the interface, wherein the advertising categories have member advertisements to be provided in conjunction with the identified media program, and the user-selected advertising control options comprise a user-selected candidate advertising category. In addition, the step of streaming the identified media program and advertisements according to the user-selected advertising control options may further include: identifying member advertisements associated with the user-selected candidate advertising category and streaming the identified media program in conjunction with the identified member advertisements. The user selected candidate advertising category may apply to only the identified media program. The identified member advertisements may consist of all of the advertisements to be provided in conjunction with the media program. In addition, the step of identifying advertisements associated with the user-selected candidate advertising category may further include identifying member advertisements in the user-selected candidate advertising category according to a user demographics and a user viewing history. In related aspects, the server may categorize the advertisements according to product. In the alternative, or in addition, the server may categorize the advertisements according to target demographic.

Ad Swap

As used herein, "Ad Swap" refers to methods that differ from Ad Selector by enabling users to instantly swap out of a streaming video ad they are watching for an alternative ad that the user has selected as being of greater interest. Other differences between Ad Swap and dynamic Ad Selector may include, in some implementations: (1) A default ad is shown automatically to the user with Hulu Ad Swap; whereas dynamic Ad Selector may require the users to choose a particular ad or wait for a timer to expire before showing the actual video ad, and (2) Hulu Ad Swap may be enabled by default for all ads whereas advertisers may be required to opt-in explicitly for their ads to be included in dynamic Ad Selector.

Ad Swap represents continuing innovation in user choice and control—an advertising innovation designed to dramatically improve the advertising experience for users and results for brands. Ad Swap may be used to put complete control in the hands of the user by enabling them to instantly swap out of an ad they are watching for one that is more relevant to the user.

Figure 8:
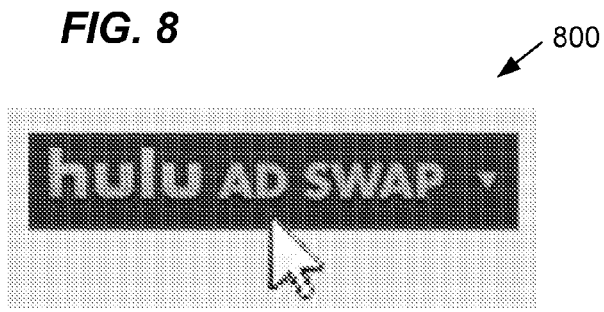
FIG. 8 illustrates an iconic interface element for initiating user interaction for selection of advertising in a streaming video segment, using an ad swap process.

The following use case illustrates operation of an Ad Swap method. In a streaming video system with ad breaks as defined herein, when an ad begins to play on a client device in a streaming video session, a user can click on an Ad Swap icon 800 presented in a media player window (e.g., in the top left corner of the player), as shown in FIG. 8. The Ad Swap object 800, or similar interactive object, may be presented in the client user interface as soon as a swappable default ad begins to play, and remain active and available for user selection for as long as the default ad continues to play.

Figure 9:
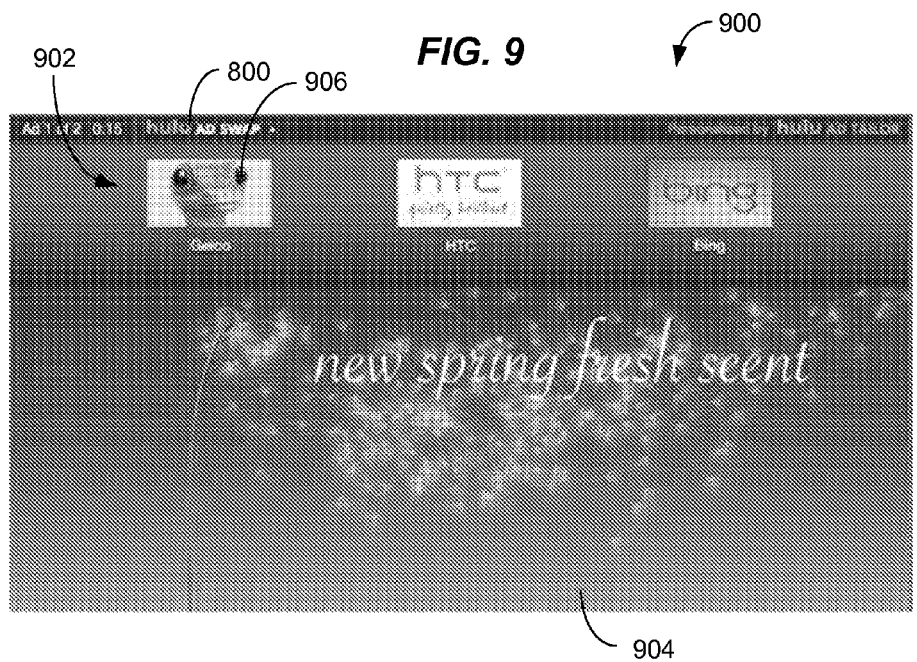
FIG. 9 illustrates a screenshot of a streaming video window during user interaction with an ad swap process for a streaming video.
Figure 10:
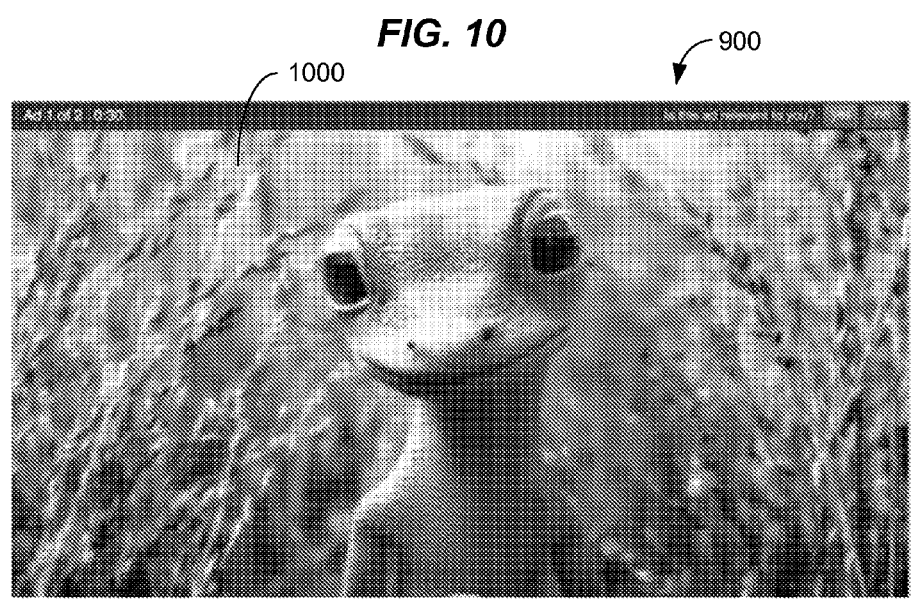
FIG. 10 illustrates a screenshot of a video interface after user selection of an ad to swap out a default ad.

The client device may have already received information for presenting alternative choices to the user at an earlier time in the streaming session. Thus, when the client detects user input indicating a selection of the Ad Swap object 800, the client device may immediately retrieve the alternative ad information from a local memory and present the alternative ads in an interactive menu 902 of a user interface window 900 displayed by a display device of the client device, as shown in FIG. 9. Like default video ads, each of the alternative ads in the menu 902 may be customized to that user's profile and previous ad viewing preferences by an ad selection engine operating on the ad server. The user may then select a more relevant ad from the available choices in the menu 902. The default video advertisement 904 may continue to be displayed and play in a separate portion of the interface 900, while the menu 902 is displayed and active. As shown in FIG. 10, immediately after the client receives user input selecting one of the alternative ads 906, the client may request and receive the alternative ad streamed from the ad server, and display the streaming alternative ad 1000 in the user interface 900. As shown in FIG. 10, the ad swap object 800 may be omitted or deactivated while the alternative ad 1000 is playing. Once the alternative ad 1000 completes playing, video program content or another default ad may be displayed in the interface 900.

In some embodiments, the advertiser whose ad 904 initially began to play may avoid being charged for an impression that is interrupted by the user. This approach may facilitate a win-win scenario for both the user, and for the advertiser. Users are provided with enhanced control over their ad experience, and the advertiser does not have to pay for a partial impression. In an online environment, advertisers have many more tools they can use to engage with key audiences, and in ways that are proven to improve brand recall, message recall, likeability, and purchase intent. With Ad Swap, advertisers may be provided with an enhanced ability to connect in meaningful ways with the consumers who are specifically interested in their brands.

Ad Swap was subjected to testing over several months, by asking consumers for their feedback. Testing showed that Ad Swap had a significant impact on effectiveness metrics, improving unaided brand recall by 93%, brand favorability by 27%, purchase intent by 35%, and stated relevancy by 46%. For example, as one user said, "It was pretty fun when the commercial would start and you knew you could change it if you wanted to. I kinda looked forward to it." Thus, Ad Swap demonstrated effectiveness in improving several metrics important to video advertising services. Metrics and considerations relevant to advertising effectiveness are discussed in more detail in the section below.

Ad Swap Effectiveness

In the design of Ad Swap, certain foundational questions were considered: What problem(s) will Ad Swap solve? Can it scale? How will we measure the effects? What are the paths to increasing monetization? Will Ad Swap create value for our customers?

A study was conducted to quantify in statistically reliable and valid terms the improvement of the ad experience for advertisers and viewers across a variety of dimensions, caused by introduction of Ad Swap. Going into the study, it was hypothesized that users wanted more choice and control, and advertisers wanted to eliminate waste (via targeting) and drive better outcomes (improved effectiveness measures). A recent Advertiser Perceptions study commissioned by the Interactive Advertising Bureau (IAB) entitled, "An Inside Look at Demand Side Perceptions of Video Advertising" quantified the criteria that advertisers, marketers, TV and online video buyers look for in their online video partnerships. Here's what the IAB study reports (in rank order):

1. Targeting 82%-88%
2. Results 85%-86%
3. Reach 68%-84%
4. Cost 28%-46%

Advertisers want better targeting and results, and viewers want more choice and relevancy. Therefore an objective of a format such as Ad Swap rooted in choice is to deliver improved relevancy and results. Success measures pertinent to this objective may include the predictive success measures that brand marketers use: Brand recall, favorability and purchase intent.

Results from the research study were very positive. Video ads that a user proactively chose to swap into (versus a video ad that was served at random) performed to a significantly greater degree than those that were not:

Unaided Recall of the brand went from 30% to 58% (+93%)
Aided Recall became near universal, from 59% to 91% (+54%)
Brand Favorability went from 34% to 43% (+27%)
Purchase Intent went from 23% to 31% (+35%)
Stated Relevancy went from 15% to 22% (+46%)

The measured performance of choice-based ad formats like Ad Swap illustrates why offering interactivity can be a powerful mechanism to improve the effectiveness of advertising. Interactive formats may significantly exceed the effectiveness and efficiency of traditional video ad formats for at least the following reasons:

Self-addressability—the consumer can choose the most relevant ad to them at that moment.
Increased attentiveness—when a choice is made, a viewer is invested in seeing the outcome.
Avoiding cognitive dissonance—consumers like to feel justified about the choices they make.

It is not necessary nor expected that users will swap ads every time they are offered the option to swap. Another benefit provided by Ad Swap is that a user has maximum control over their ad experience, and can swap their ad if they choose to do so. In fact, response rates may be relatively low, e.g., around three percent, while still improving the user inexperience and advertising results. Each time a user chooses to swap an ad, the ad system can thereby learn a little more about the user's preferences. Such learning can be aggregated over time and many different users to improve the interest and appeal of video advertisements provide a better ad experience for users, a better ad platform for advertisers, and an improved monetization vehicle for program content providers.

Implementation Issues and Solutions

One of the objectives of Ad Swap is to increase control in the hands of the user by enabling users to instantly swap out of an ad for an alternative ad one that is more relevant or appealing. This objective stems from an insight gained from introduction of the Ad Selector: empowering users with choices over the ads they consume can lead to a virtuous cycle where advertisers benefit from a more engaged audience, content providers can see a greater return on their content, and users get more control and greater choice in their experience.

Although Ad Swap may seem like a simple idea, it may involve implementation challenges in real-world streaming video systems. Some technical problems overcome for the development of Ad Swap in the Hulu® video streaming system are discussed below.

Certain similarities and differences between Ad Swap and Ad Selector have been summarized in the introduction to Ad Swap above. In view of those differences, implementation of dynamic Ad Selector is summarized before treating Ad Swap. In an earlier static version of Ad Selector, ad choices were statically defined within the selector slate. In contrast, in dynamic Ad Selector, the ad selection server (sometimes referred to herein as the "adserver") assembles all the user-selectable options in a dynamic ad selector slate for each instance, for example, for each video program started in each streaming session.

One of the main purposes of the adserver is selecting an ad that the user will see; thus, for example, the efficiency of constructing a dynamic three-ad selector slate is effectively 33% of normal, because only one ad is watched by a user for every three ads selected. Moreover, ads chosen for a dynamic Ad Selector may be required to obey an anti-ad-fatigue rule (for example, no two ads from the same brand can run side-by-side) and industry separation rule (for example, no two ads of the same industry but from different advertisers can run side-by-side). Such constraints may place limits on how far the overhead of selecting the extra ads for a dynamic Ad Selector can be reduced. Because of these issues, in one implementation, use of the dynamic Ad Selector was limited to serving the selector slate once per stream or less.

Compared with dynamic Ad Selector, Ad Swap may be a far more ambitious undertaking, because it may require alternative ads to be chosen for every single ad served. Calling for three alternatives for every ad might under some implementations reduce the efficiency of the adserver under an Ad Swap implementation to 25% of what it was before. In addition, implementing a new feature with this sort of performance reduction may unacceptably increase the risk of limiting scalability of the adserver resource. A more acceptable implementation of Ad Swap should minimize the loss of efficiency and better preserve scalability.

To further illustrate these issues, the following pseudo code may be hypothesized as a straight-forward but inefficient implementation of Ad Swap: (1) Upon receiving an ad request for an ad break from the video player, the adserver selects one or more default ads, plus three alternative ads for every default ad. Recognizing that each ad break may have more than one ad, Step 1 is repeated until the adserver has all the default+alternative ads the player will need for the ad break, at which point the ads are returned to the player.

Of course, the pseudo code above omits a lot of the details involved in the ad selection process. For example, all of the default and alternative ads chosen may have to obey their own targeting rules which could include but are not limited to content, day-part, demographic, or geographic restrictions as well as anti-ad-fatigue and industry separation rules. Most advertisers also require their campaigns to be delivered evenly over time, and that places further constraints on the number of ads available for selection at any given time. Such details of ad selection are not the subject of the present disclosure, and may be as known in the art and/or may include future innovations.

The adserver also may allow advertisers to specify the maximum number of ads that their ads are allowed to run alongside within a single ad break (or pod). This gives advertisers a lot of flexibility in executing their marketing strategy by making trade-offs between focusing the targeting of the ads to a particular group, and having broad exposure of their messages. However, having different ads-per-pod limits among different campaigns can introduce significant difficulties in carrying out the Ad Swap selection algorithm, as the system does not necessarily know how many ads will be needed in an ad break until the user has chosen among the default and alternative ads. A conservative approach may resolve this problem by selecting ads with ads-per-pod limits equal to or greater than the minimum ads-per-pod limit of all the ads that we have selected for the ad break so far, but that places an additional restriction on the pool of available ads.

Apart from the considerable processing overhead, the large number of rules that may be needed for alternative ads selection may also raise concerns over whether the adserver can actually find enough alternative ads in real-world conditions. To increase the chance of the adserver finding the number of alternative ads that Ad Swap requires, the anti-ad-fatigue and industry separation rules may be relaxed so as to apply only to ads that are chosen by the user. This, however, leads to a drastic change in the ad selection protocol between the player and the adserver that resembles the following: On each ad request from the player, the adserver: (1) selects default ad plus alternative ads; and (2) the player waits for the user to make the final selection before making another ad request with the ad chosen by the user. This way, the ad server has the information it needs to apply anti-ad-fatigue and industry separation rules only to the ad that the user actually watched. In addition, to ensure a good user experience, the adserver needs to avoid serving the same ad that the user has just swapped out.

In view of the foregoing issues, configuring an adserver away from a one-request-per-ad-break protocol, to a one-request-per-ad (+alternatives) protocol might not immediately appear to be feasible in some server systems. The shift substantially increases processing overhead in the form of extra network calls between the client player and the adserver, on top of the overhead of selecting the alternative ads. In addition, the communication protocol between the player and the adserver may need to be more complicated in order to maintain additional state information between ad selections that is currently hidden within a one-request-per-ad-break protocol. For example, the one-request-per-ad protocol needs to keep track of the ads-per-pod limit of the ads that have been served so far, whereas the adserver keeps track of this internally in the current one-request-per-ad-break protocol.

Such difficulties may be overcome by brute force increases in processing power and communications bandwidth. However, the following unexpected insight led to a more elegant solution: If switching to a one-request-per-ad protocol is the source of undue complexities, can't alternative ad selection be fit into a one-request-per-ad-break protocol instead? Surprisingly, yes it can, and here is how: (1) The adserver selects all the default ads within an ad break as the adserver does in a one-request-per-ad-break protocol; (2) Then, the adserver selects alternative ads for the entire ad break with anti-ad-fatigue and industry separation rules applied across the default and alternative ads within the ad break. Consequently, the alternative ads are available for all ads within the ad break instead of being selected separately for each ad. In this approach, because the ad server knows exactly how many default ads are selected for serving in the ad break, it may easily select alternative ads with a compatible ads-per-pod limit.

As an added bonus, given that the alternative ads are collectively available for all ads within the ad break instead of being selected separately for each ad, it becomes possible to select fewer alternative ads while maintaining the same number of choices. More precisely, the adserver only needs to select n+2 alternative ads to maintain a minimum of at least 3 choices in an n-ads-per-pod ("n-APP") scenario, whereas 3n alternatives would be needed if the adserver selects them separately for each ad. So for a 2-APP scenario, only 2+2=4 alternative ads would be needed if alternative ads are available for the entire ad break, versus the 3×2=6 alternative ads required if they are selected separately for each ad. More generally, if "n" designates the number of default ads per pod, and "c" designates the desired number of alternative ads to present for each default ad, the number of alternative ads for the ad break may be determined by n+c−1.

To resolve doubts as to whether or not an available adserver can handle the overhead of selecting the reduced number of alternative ads afforded by collectivizing the alternative ads over an ad break per n+c−1, and whether the adserver can find sufficient number of alternative ads, the collectivizing, one-request-per-ad-break code may readily be tested using an existing adserver. Such testing may not be possible without system upgrades if implementing a one-request-per-ad protocol, which may require changes in both the adserver and the video player client before measuring the full impact in production.

In one example, implementing the collectivizing code on an existing adserver resulted in a barely noticeable increase in overhead from selecting the alternative ads. In some cases the adserver could not find as many alternatives as desired, it could find them in a majority of the cases. Thus, the described collectivization should be a feasible approach for alternative ad selection, without requiring system upgrades. It should be appreciated that although the various designs described above may be superficially quite similar to one another, slight differences turned a seemingly infeasible design into a viable one, and such differences should therefore be fully understood and fairly valued.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Video Host Server Operations and Apparatus

Figure 11:
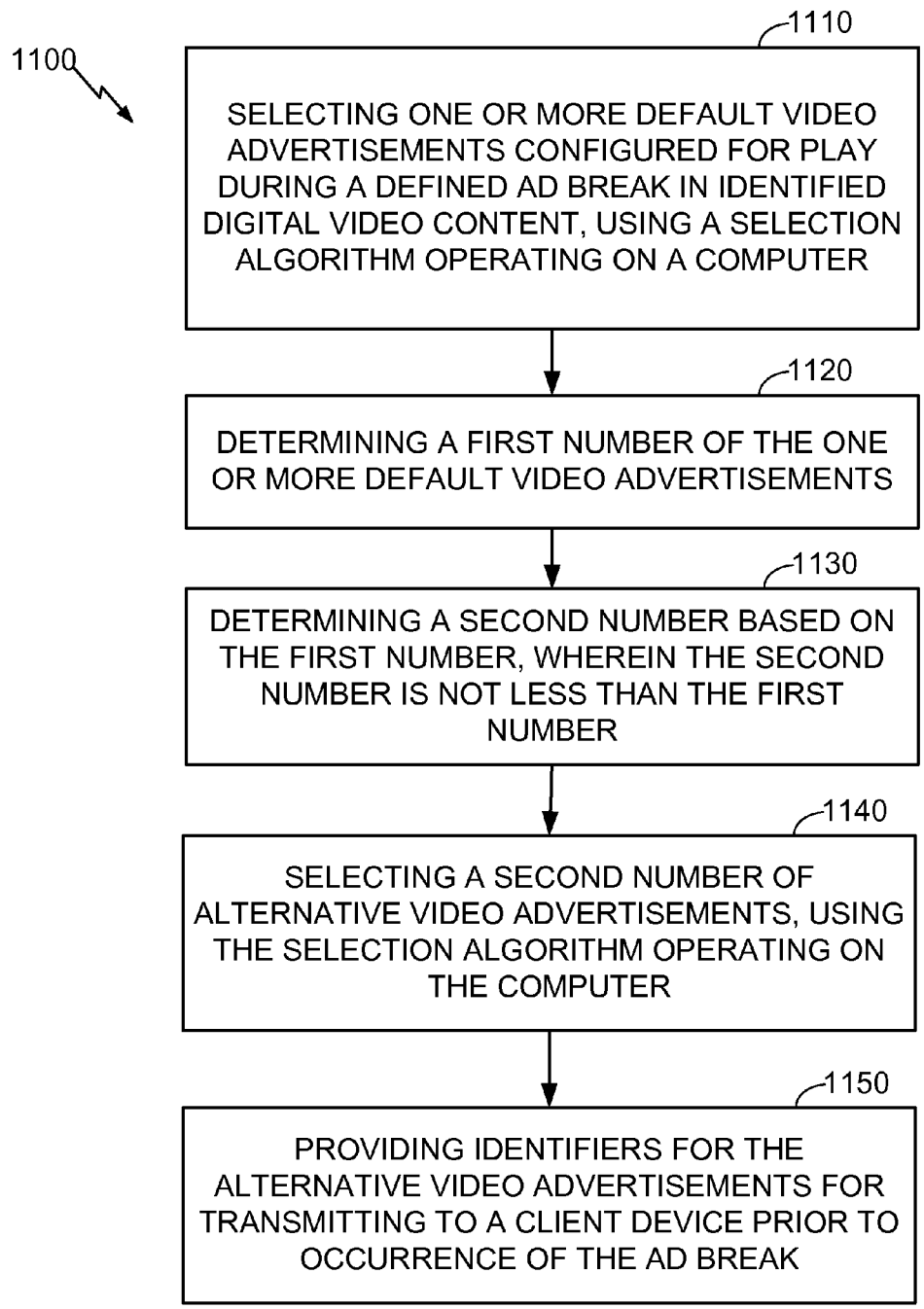

As shown in FIG. 11, a network node of a computer server system may perform a method 1100 for determining selection or configuration of swappable advertising in a streaming video segment. The method 1100 may include at 1110, selecting one or more default video advertisements configured for play during a defined ad break in identified digital video content, using a selection algorithm operating on a computer. For example, the node may select a set of default ads based on user profile or user preference information, coupled with advertiser preferences and a set of selection rules as exemplified in the disclosure above. The default ads may be selected for a defined ad break, or some number of ad breaks defined for a particular video program.

The method 1100 may further include, at 1120, determining a first number of the one or more default video advertisements. For example, the node may divide the duration of the ad break by the duration of each default ad, or by duration of a type of ad. In the alternative, the node may set the first number to a fixed static value retained in a computer memory. The operation 1120 may be performed before or after the selection operation 1110.

The method 1100 may further include, at 1130, determining a second number based on the first number, wherein the second number is not less than the first number. For example, the node may compute the second number using the n+c−1 relation described in the disclosure above, wherein 'n' equals the first number, and 'c' equals the number of alternatives desired for each default ad. The operation 1130 may be performed before or after the selection operation 1110.

The method 1100 may further include, at 1140, selecting a second number of alternative video advertisements, using the selection algorithm operating on the computer. The number of alternative video advertisements selected may be equal to the second number. The alternative advertisements may be selected from available candidates using a process similar to that used for the default ads. In general, the system may select alternative advertisements at any appropriate time prior to presentation of the alternative ads on the client. For example, the system may select all default and alternative ads for a video program in advance of a first ad slot. In other embodiments, the system may select a set of default and alternative ads for each ad slot, just prior to the ad slot on the client player device. In the alternative, or in addition, the system may select alternative ads for a particular default ad in advance of playing the default ad or shortly after beginning play of the default ad.

The method 1100 may further include, at 1150, providing identifiers for the alternative video advertisements for transmitting to a client device prior to occurrence of the ad break. For example, the identifiers may be provided from index numbers locating each ad in a data store coupled to the network node.

With reference to FIGS. 12-15, several additional operations 1200, 1300, 1400 and 1500 are depicted for an ad swap process, which may be performed by a computer server, alone or in combination with a client device and/or another server. One or more of operations 1200, 1300, 1400 and 1500 may optionally be performed as part of method 1100. The elements of these operations may be performed in any operative order, or may be encompassed by a development algorithm without requiring a particular chronological order of performance Operations can be independently performed and are not mutually exclusive. Therefore any one of such operations may be performed regardless of whether another downstream or upstream operation is performed. For example, if the method 1100 includes at least one of the operations 1200, 1300, 1400 and 1500, then the method 1100 may terminate after the at least one operation, without necessarily having to include any subsequent downstream operation(s) that may be illustrated.

In an aspect, with reference to FIG. 12, the method 1100 may further include, at 1310, detecting, during or before streaming of one of the default video advertisements to the client device, a signal from the client device requesting that one of the alternative video advertisements be swapped for the one of the default video advertisements. For example, a client device may receive user input during play of a default ad, indicating a user request to swap out the default ad with a specific alternative. The client may transmit a signal to the server identifying the alternative ad. The method 1100 may further include, at 1220, interrupting streaming of the one of the default video advertisements to the client device, and initiating streaming of the one of the alternative video advertisements, in response to detecting the signal. In an aspect 1230 of the method 1100, the default advertisement that is playing when the user input requests an alternative ad may be any one of the first number of default video advertisements. In another aspect, the detecting 1310 may be performed during streaming of the one of the default video advertisements to the client device, as indicated at block 1240.

In another aspect, with reference to FIG. 13, the method 1100 may further include, at 1410, receiving a request for the digital video content from the client device, and streaming the digital video content including the defined ad break to the client device, in response to the request. This operation 1410 may be performed prior to all of the operations of the method 1100 diagrammed in FIG. 11. In other embodiments, the operation 1410 may be performed after one or more operations of the method 1100. In another aspect, the method 1100 may, at 1320, be performed in response to receiving a message indicating that the defined ad break is anticipated in the identified digital video content being played on the client device. For example, the message, which may be transmitted by a client device to the server, may act as a trigger for initiating the method 1100. In another aspect, the method 1100 may further comprise, at 1330, providing thumbnail images indicative of the alternative video advertisements to the client device for display in a client interface during play of the one or more default video advertisements. Examples of thumbnail images for alternative ad candidates are provided in FIG. 9.

In other aspects, with reference to FIG. 14, determining the second number in the method 1100 may further include, at 1410, setting the second number greater than the first number, for example using the relation n+c−1 as previously described. For example, determining the second number in the method 1100 may further include, at 1420, calculating a sum of the first number and two, such as, for example, when the desired number of alternatives for each default ad is three.

Figure 15:
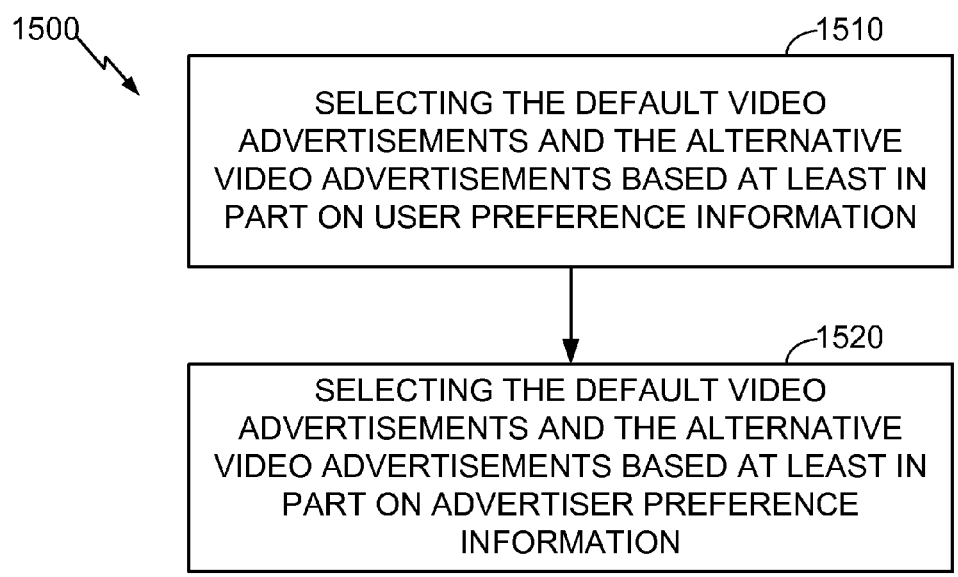

In other aspects, with reference to FIG. 15, the method 1100 may further include, at 1510, selecting the default video advertisements and the alternative video advertisements based at least in part on user preference information. For example, ads may be targeted to a known or presumed user demographic, or to match preferences obtained via a user survey or inferred from past video content selections of the user. In the alternative, or in addition the method 1200 may further include, at 1520, selecting the default video advertisements and the alternative video advertisements based at least in part on advertiser preference information.

Figure 16:
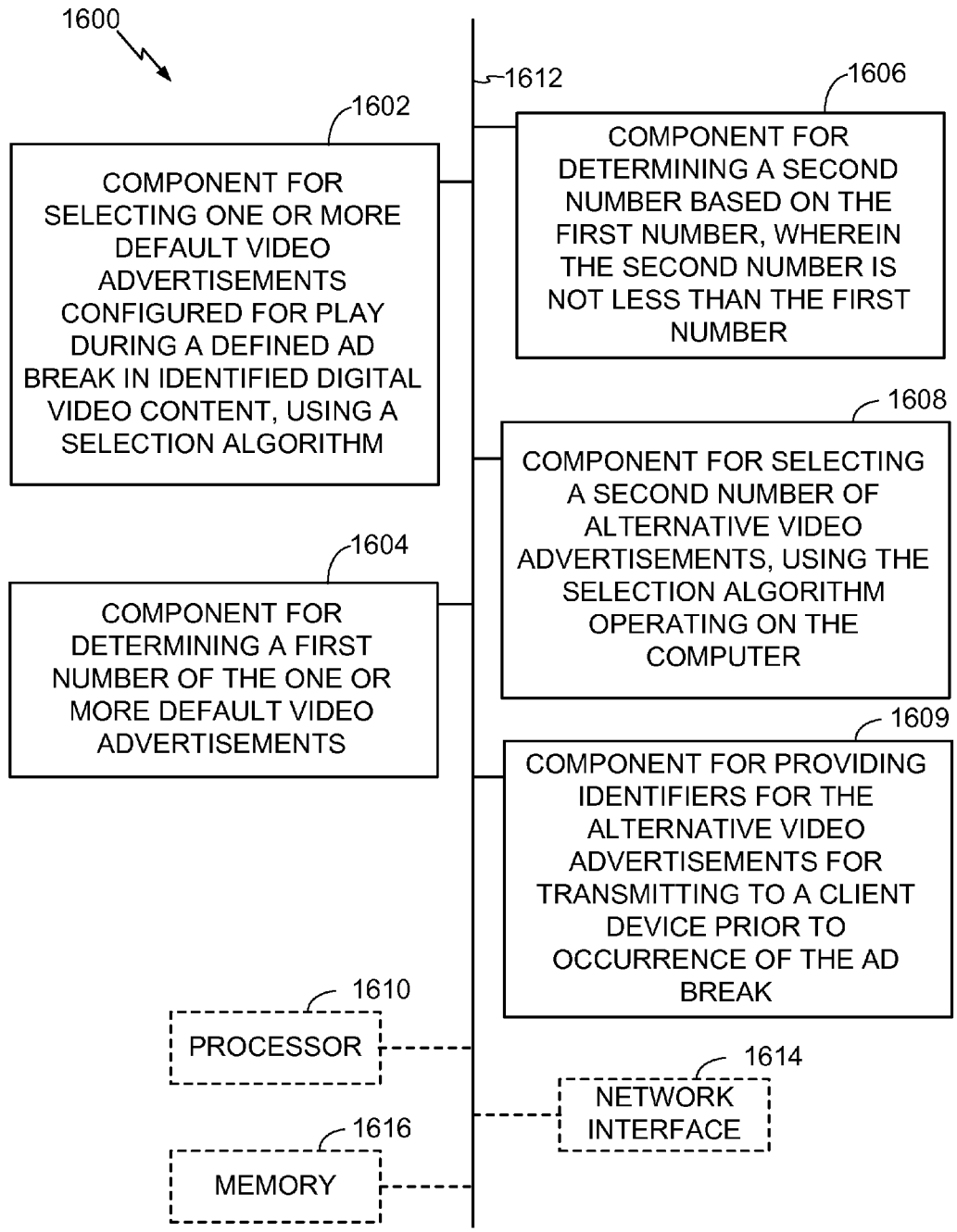
FIG. 16 is a diagram illustrating a network node configured for selection of advertising in a streaming video segment using preconfigured video ad swapping.

With reference to FIG. 16, there is provided an exemplary apparatus 1600 that may be configured as computer server, or combination of client device and server, for implementing an ad swap process in a streaming video system.

As illustrated, in one embodiment, the apparatus 1600 may include an electrical component or means 1602 for selecting one or more default video advertisements configured for play during a defined ad break in identified digital video content, using a selection algorithm. For example, the electrical component or means 1602 may include at least one control processor 1610 coupled to a memory component 1616. The control processor may operate an algorithm, which may be held as program instructions in the memory component. The algorithm may include, for example, filtering metadata for a set of available video ads, using advertiser preference criteria and user demographic or preference information.

The apparatus 1600 may further include an electrical component or module 1604 for determining a first number of the one or more default video advertisements. For example, the electrical component or means 1604 may include at least one control processor 1610 coupled to a memory component 1616. The control processor may operate an algorithm, which may be held as program instructions in the memory component. The algorithm may include, for example, dividing a duration of one or more ad breaks by a duration of selected default ads, or known duration of a class of ads.

The apparatus 1600 may further include an electrical component or module 1606 for determining a second number based on the first number, wherein the second number is not less than the first number. For example, the electrical component or means 1606 may include at least one control processor 1610 coupled to a memory component 1616. The control processor may operate an algorithm, which may be held as program instructions in the memory component. The algorithm may include, for example, calculating the second number using the relation n+c−1 as described in more detail herein above.

The apparatus 1600 may further include an electrical component or module 1608 for selecting a second number of alternative video advertisements, using the selection algorithm operating on the computer. For example, the electrical component or means 1608 may include at least one control processor 1610 coupled to a memory component 1616. The control processor may operate an algorithm, which may be held as program instructions in the memory component. The algorithm may include, for example, operations similar to those described for selecting the default advertisements.

The apparatus 1600 may further include an electrical component or module 1609 for providing identifiers for the alternative video advertisements for transmitting to a client device prior to occurrence of the ad break. For example, the electrical component or means 1609 may include at least one control processor 1610 coupled to a memory component 1616. The control processor may operate an algorithm, which may be held as program instructions in the memory component. The algorithm may include, for example, transmitting identifiers for the default and alternative advertisements a few seconds before the client device reaches the ad break in a streaming session, in response to a signal from the client indicating an incipient ad break.

The apparatus 1600 may include similar electrical components for performing any or all of the additional operations 1200-1500 described in connection with FIGS. 12-15, which for illustrative simplicity are not shown in FIG. 16.

In related aspects, the apparatus 1600 may optionally include a processor component 1610 having at least one processor. The processor 1610 may be in operative communication with the components 1602-1609 or similar components via a bus 1612 or similar communication coupling. The processor 1610 may effect initiation and scheduling of the processes or functions performed by electrical components 1602-1606.

In further related aspects, the apparatus 1600 may include a network interface component 1614 enabling communication between a client and a server. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for implementing the processes and behavior of the components 1602-1609, and subcomponents thereof, or the processor 1610, or the methods disclosed herein. The memory component 1616 may retain instructions for executing functions associated with the components 1602-1609. While shown as being external to the memory 1616, it is to be understood that the components 1602-1609 can exist within the memory 1616.

Client-Side Operations and Apparatus

Figure 17:
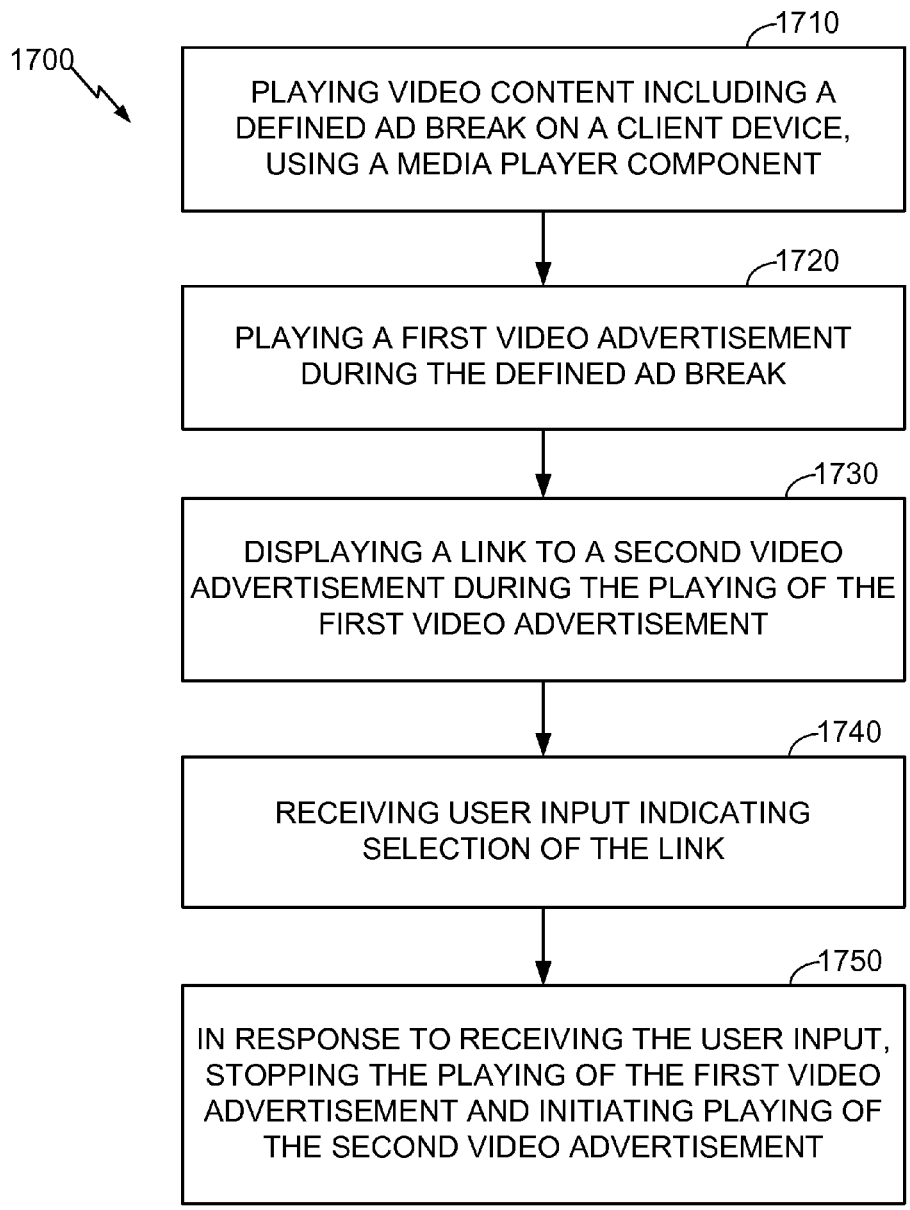
FIGS. 17-19 are diagrams illustrating operations that may be performed by a client device in connection with selection of advertising in a streaming video segment using preconfigured video ad swapping.

A method 1700 shown in FIG. 17 may be performed by a client device for selection or configuration of advertising in a streaming video segment based on results of a computer ad swap process. The method 1700 may include, at 1710, playing video content including a defined ad break on a client device, using a media player component. For example, the client device may receive user input selecting a link on a displayed page, and send a request for the video segment to a designated network address based on the link selection. In response, a network node may stream the video segment to the client node with information defining one or more ad breaks, and the client may use a media player component to play the streaming video.

The method 1700 may further include, at 1720, playing a first video advertisement during the defined ad break. For example, the client player may alert an adserver when an ad break is about to occur, using a network connection. In response, the ad server may select default ads and alternative ads, and stream the default ads in sequence to the client unless and until receiving a signal from the client to swap out a default ad for an alternative ad. The client may play each default ad in the order received, using the media player component.

The method 1700 may further include, at 1730, displaying a link to a second video advertisement during the playing of the first video advertisement. As used herein, a "link" means a selectable user interface object that when selected, causes the client to request the linked content. For example, prior to the ad break, the adserver may provide information defining one or more alternative ads to the client, which may display a menu including options for selecting one of the alternative ads in a user interface. An example of such a user interface with options is illustrated in FIG. 9.

The method 1700 may further include, at 1740, the client device receiving user input indicating selection of the link. For example, the client may detect user selection of a link by receiving a signal from a user input device. The input may be received while the default video ad is playing on the client device.

The method 1700 may further include, at 1750, stopping the playing of the first video advertisement and initiating playing of the second video advertisement, in response to receiving the user input. For example, the adserver may receive a request for the alternative ad generated by the client device in response to user selection of the link. In response to the request, the adserver may initiate streaming of the alternative ad to the client device. In response to receiving the streaming alternative ad, the client may stop playing the default ad and begin playing the alternative ad. In some embodiments, the player may deactivate the ad swap functionality of the user interface while the alternative ad is playing.

It should be appreciated that the operations described in connection with the method 1700 may involve operations of a computer server to the extent that the client device is operating as a dumb terminal or portal to a process occurring at a different computer. Various distributions of these operations may be implemented between a client device and host device, without departing from the scope of the method 1700.

Figure 18:
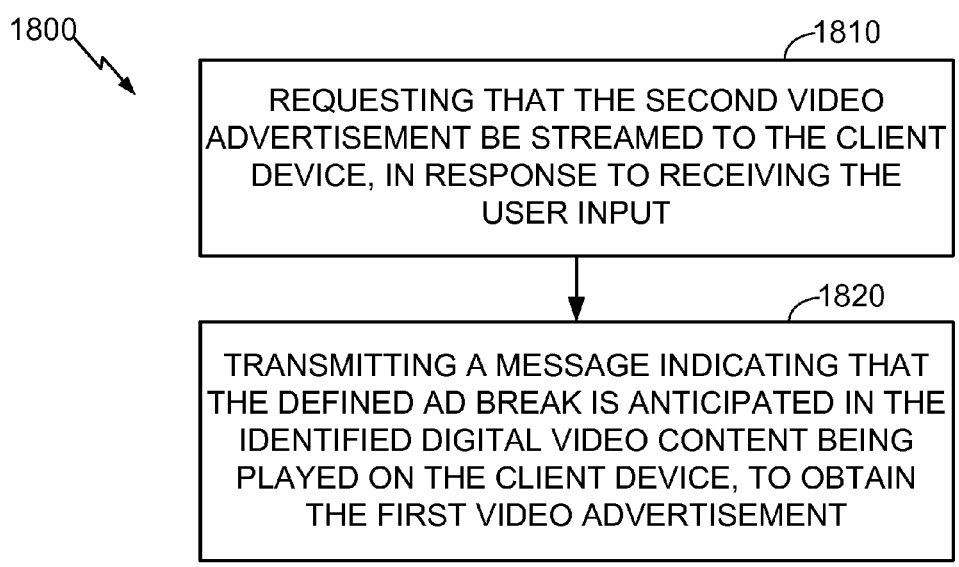
Figure 19:
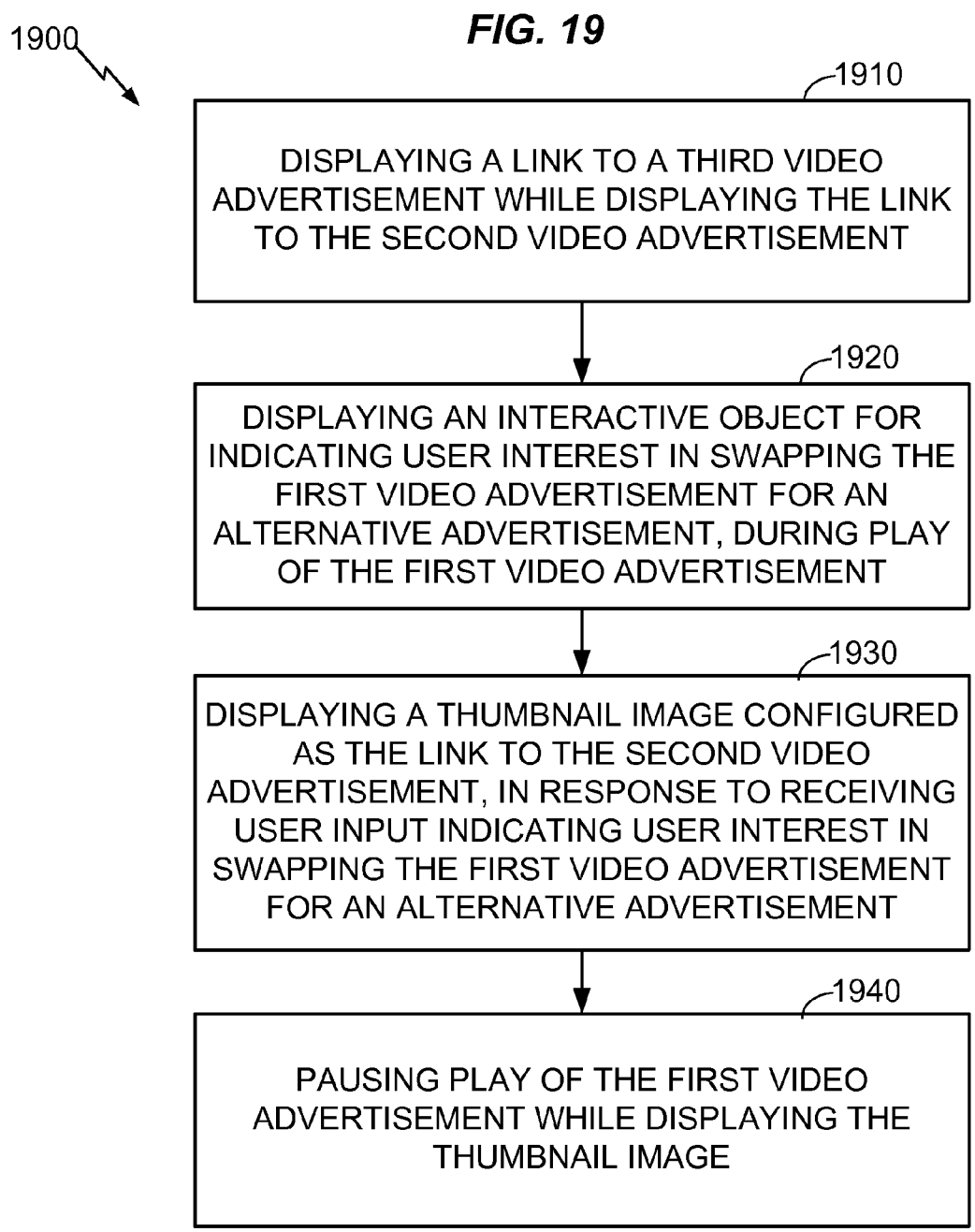

With reference to FIGS. 18-19, several additional operations 1800 and 1900 are depicted for implementing ad swap, which may be performed by a client device, alone or in combination with a server. One or more of these operations may optionally be performed as part of the method 1700. The elements of these operations may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1700 includes at least one of the operations 1800 or 1900, then the method 1700 may terminate after the at least one operation, without necessarily having to include any subsequent downstream operation(s) that may be illustrated.

In an aspect, with reference to FIG. 18, the method 1700 may further include, at 1810, requesting that the second video advertisement be streamed to the client device, in response to receiving the user input. For example, the client may transmit a signal identifying the alternative ad to the adserver. In the alternative, the client may retrieve a cached copy of the alternative ad from a local memory.

The method 1700 may further include, at 1820, transmitting a message indicating that the defined ad break is anticipated in the identified digital video content being played on the client device, to obtain the first video advertisement. The client may perform the operation 1820 prior to the operation 1720 of method 1700. This operation may be used to alert the adserver of the need to select default and alternative ads for the ad break.

In another aspect, with reference to FIG. 19, the method 1700 may further include, at 1910, displaying a link to a third video advertisement while displaying the link to the second video advertisement. For example, the client device may display links to three alternative ads together on the user interface, as shown in FIG. 9, or some other plural number of alternative ads.

The method 1700 may further include, at 1920, displaying an interactive object for indicating user interest in swapping the first video advertisement for an alternative advertisement, during play of the first video advertisement. For example, the client may display an Ad Swap object as shown in FIGS. 8 and 9. The client device may interpret defined user input connected to the object as an indication of user interest in swapping out a default ad.

The method 1700 may further include, at 1930, displaying a thumbnail image configured as the link to the second video advertisement, in response to receiving user input indicating user interest in swapping the first video advertisement for an alternative advertisement. For example, in response to user selection of an Ad Swap icon, the client may display a menu of alternative ads available for selection by the user, or some subset of alternative ads available, as shown in FIG. 9. In the alternative, the client may display the menu without waiting for the user to signal an interest in swapping an ad. In some embodiments, as shown at block 1940, the client may pause playback of the default ad while displaying the menu of alternative ads; while in other embodiments, the client may continue playing the default ad.

Figure 20:
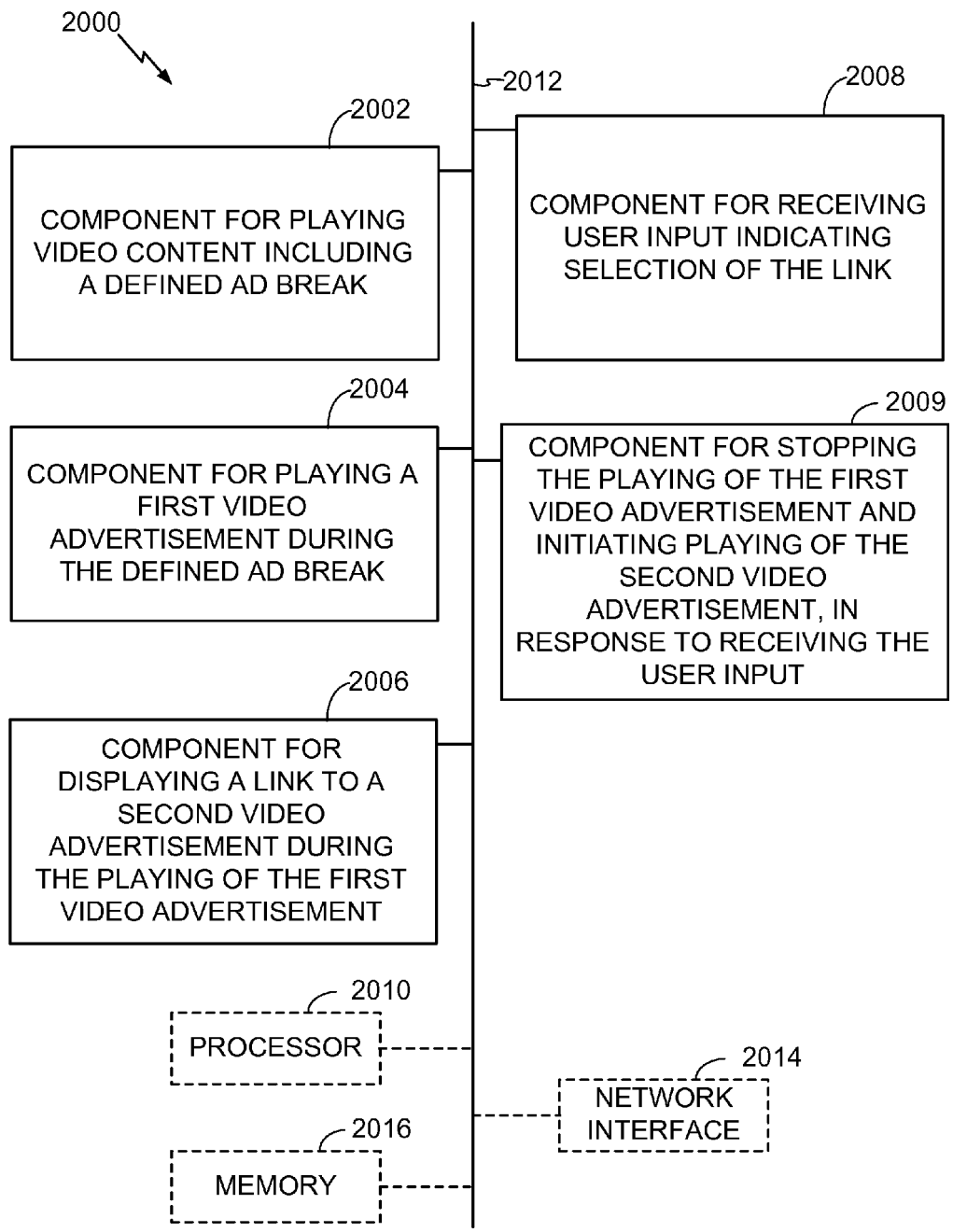
FIG. 20 is a diagram illustrating a client device configured for selection of advertising in a streaming video segment using preconfigured video ad swapping.

With reference to FIG. 20, there is provided an exemplary apparatus 2000 that may be configured as client device or combination of client and server, for implementing an ad swap process. The apparatus 2000 may include functional blocks that can represent functions implemented by a processor, software, or combination thereof (e.g., firmware).

As illustrated, in one embodiment, the apparatus 2000 may include an electrical component or means 2002 for playing video content including a defined ad break. For example, the electrical component or means 2002 may include at least one control processor 2010 coupled to a memory component 2016. The control processor may operate an algorithm, which may be held as program instructions in the memory component. The algorithm may include, for example, receiving streaming video data from a content server with metadata defining one or more ad breaks, processing the metadata to obtain control parameters for a media player component, providing the control parameters to the media player, and operating the media player according to the control parameters.

The apparatus 2000 may further include an electrical component or module 2004 for playing a first video advertisement during the defined ad break. For example, the electrical component or means 2004 may include at least one control processor 2010 coupled to a memory component 2016. The control processor may operate an algorithm, which may be held as program instructions in the memory component. The algorithm may include, for example, requesting the default ad from an adserver in advance of an ad break, receiving streaming data comprising the default ad, and playing the default ad at the client during the ad break.

The apparatus 2000 may further include an electrical component or module 2006 for displaying a link to a second video advertisement during the playing of the first video advertisement. For example, the electrical component or means 2006 may include at least one control processor 2010 coupled to a memory component 2016. The control processor may operate an algorithm, which may be held as program instructions in the memory component. The algorithm may include, for example, receiving information identifying alternative ads from the adserver, and displaying the information in an interactive menu as described in connection with FIG. 9.

The apparatus 2000 may further include an electrical component or module 2008 for receiving user input indicating selection of the link. For example, the electrical component or means 2008 may include at least one control processor 2010 coupled to a memory component 2016. The control processor may operate an algorithm, which may be held as program instructions in the memory component. The algorithm may include, for example, receiving user input from a user interface while displaying the link to the second video advertisement, and inferring that the user input constitutes a user selection of the link based on a state of the user interface when the user input is received.

The apparatus 2000 may further include an electrical component or module 2009 for stopping the playing of the first video advertisement and initiating playing of the second video advertisement, in response to receiving the user input. For example, the electrical component or means 2009 may include at least one control processor 2010 coupled to a memory component 2016. The control processor may operate an algorithm, which may be held as program instructions in the memory component. The algorithm may include, for example, transmitting a request for the alternative ad in response to user selection of the link, receiving the streaming alternative ad in response to the request, and stopping play of the default ad and begin playing the alternative ad in response to receiving streaming of the alternative ad.

The apparatus 2000 may include similar electrical components for performing any or all of the additional operations 1800 or 1900 described in connection with FIGS. 18-19, which for illustrative simplicity are not shown in FIG. 20.

In related aspects, the apparatus 2000 may optionally include a processor component 2010 having at least one processor, in the case of the apparatus 2000 configured to include a processor for a client device. The processor 2010 may be in operative communication with the components 2002-2009 or similar components via a bus 2012 or similar communication coupling. The processor 2010 may effect initiation and scheduling of the processes or functions performed by electrical components 2002-2009.

In further related aspects, the apparatus 2000 may include a network interface component 2014 enabling communication between a client and a server. The apparatus 2000 may include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for implementing the processes and behavior of the components 2002-2009, and subcomponents thereof, or the processor 2010, or the methods disclosed herein. The memory component 2016 may retain instructions for executing functions associated with the components 2002-2009. While shown as being external to the memory 2016, it is to be understood that the components 2002-2009 can exist within the memory 2016.

It is understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for configuring swappable video advertisements, the method comprising:
    selecting one or more default video advertisements configured for play during a defined ad break in identified digital video content, using a selection algorithm operating on a computer;
    determining, by the computer, a first number of the one or more default video advertisements;
    determining, by the computer, a second number based on the first number, wherein the second number is not less than the first number, wherein determining the second number further comprises calculating a sum of the first number and two;
    selecting, by the computer, the second number of alternative video advertisements, using the selection algorithm operating on the computer; and
    providing, by the computer, identifiers for the alternative video advertisements for transmitting to a client device prior to occurrence of the ad break.

2. The method of claim 1, further comprising receiving a request for the digital video content from the client device, and streaming the digital video content including the defined ad break to the client device, in response to the request.

3. The method of claim 1, further comprising detecting, during or before streaming of one of the default video advertisements to the client device, a signal from the client device requesting that one of the alternative video advertisements be swapped for the one of the default video advertisements.

4. The method of claim 3, further comprising interrupting streaming of the one of the default video advertisements to the client device, and initiating streaming of the one of the alternative video advertisements, in response to detecting the signal.

5. The method of claim 3, wherein the one of the default video advertisements comprises any one of the first number of default video advertisements.

6. The method of claim 3, wherein detecting the signal is performed during streaming of the one of the default video advertisements to the client device.

7. The method of claim 1, wherein the second number is greater than the first number.

8. The method of claim 1, performed in response to receiving a message indicating that the defined ad break is anticipated in the identified digital video content being played on the client device.

9. The method of claim 1, further comprising providing thumbnail images indicative of the alternative video advertisements to the client device for display in a client interface during play of the one or more default video advertisements.

10. The method of claim 1, wherein the selection algorithm selects the default video advertisements and the alternative video advertisements based at least in part on user preference information.

11. The method of claim 1, wherein the selection algorithm selects the default video advertisements and the alternative video advertisements based at least in part on advertiser preference information.

12. An apparatus, comprising:
at least one computer processor configured for:
selecting one or more default video advertisements configured for play during a defined ad break in identified digital video content, using a selection algorithm;
determining a first number of the one or more default video advertisements;
determining a second number based on the first number, wherein the second number is not less than the first number, wherein determining the second number further comprises calculating a sum of the first number and two;
selecting the second number of alternative video advertisements, using the selection algorithm operating on the computer; and
providing identifiers for the alternative video advertisements for transmitting to a client device prior to occurrence of the ad break; and
a memory coupled to the at least one computer processor for storing data.

13. The apparatus of claim 12, wherein the computer processor is further configured for receiving a request for the digital video content from the client device, and streaming the digital video content including the defined ad break to the client device, in response to the request.

14. The apparatus of claim 12, wherein the computer processor is further configured for detecting, during or before streaming of one of the default video advertisements to the client device, a signal from the client device requesting that one of the alternative video advertisements be swapped for the one of the default video advertisements.

15. The apparatus of claim 14, wherein the computer processor is further configured for interrupting streaming of the one of the default video advertisements to the client device, and initiating streaming of the one of the alternative video advertisements, in response to detecting the signal.

16. The apparatus of claim 12, wherein the computer processor is further configured for determining the second number is greater than the first number.

17. The apparatus of claim 12, wherein the computer processor is further configured for selecting the one or more default video advertisements in response to receiving a message indicating that the defined ad break is anticipated in the identified digital video content being played on the client device.

18. The apparatus of claim 12, wherein the computer processor is further configured for providing thumbnail images indicative of the alternative video advertisements to the client device for display in a client interface during play of the one or more default video advertisements.

19. The apparatus of claim 12, wherein the selection algorithm is configured for selecting the default video advertisements and the alternative video advertisements based at least in part on user preference information.

20. The apparatus of claim 12, wherein the selection algorithm is configured for selecting the default video advertisements and the alternative video advertisements based at least in part on advertiser preference information.

21. A computer program product, comprising:
a non-transitory computer-readable medium comprising code for:
selecting one or more default video advertisements configured for play during a defined ad break in identified digital video content, using a selection algorithm;
determining a first number of the one or more default video advertisements;
determining a second number based on the first number, wherein the second number is not less than the first number, wherein determining the second number further comprises calculating a sum of the first number and two;
selecting the second number of alternative video advertisements, using the selection algorithm operating on the computer; and
providing identifiers for the alternative video advertisements for transmitting to a client device prior to occurrence of the ad break.

* * * * *